(12) United States Patent
Elston et al.

(10) Patent No.: US 12,210,989 B2
(45) Date of Patent: Jan. 28, 2025

(54) EXPORTING WORKFORCE MANAGEMENT SERVICE RECORDS AND NON-ITERATIVELY REVISING TASK ASSIGNMENTS

(71) Applicant: State Farm Mutual Automobile Insurance Company, Bloomington, IL (US)

(72) Inventors: Chris Elston, Hudson, IL (US); Steve Skrzypczynski, El Paso, IL (US); Blain Johnson, Bloomington, IL (US); Nick Monical, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 66 days.

(21) Appl. No.: 17/578,354

(22) Filed: Jan. 18, 2022

(65) Prior Publication Data
US 2023/0229991 A1    Jul. 20, 2023

(51) Int. Cl.
*G06Q 10/0631* (2023.01)
(52) U.S. Cl.
CPC ........... *G06Q 10/063116* (2013.01); *G06Q 10/06312* (2013.01); *G06Q 10/06315* (2013.01)
(58) Field of Classification Search
None
See application file for complete search history.

(56) References Cited

U.S. PATENT DOCUMENTS 5,596,502 A * 1/1997 Koski ............... G06Q 10/06
700/95
6,970,829 B1 * 11/2005 Leamon ......... G06Q 10/063116
705/7.14

(Continued)

OTHER PUBLICATIONS

Koole, Ger, and Auke Pot. "An overview of routing and staffing algorithms in multi-skill customer contact centers." (2006) (Year: 2006).*

(Continued)

*Primary Examiner* — Darlene Garcia-Guerra
(74) *Attorney, Agent, or Firm* — Lee & Hayes, P.C.

(57) ABSTRACT

A non-iterative revising tool is provided, which interfaces with a WFM service running on one or more WFM hosts. The non-iterative revising tool can configure a client computing device to export timetable records and staffing forecast records from a WFM service; non-iteratively revise, for a referent employee, task assignments of timetable records to fulfill forecast workload volumes of a primary task type according to conditions not implemented by conventional WFM services; and import revised timetable records into the WFM service after work task assignments have been at least partially aligned with forecast workload volumes based on an alignment objective. The non-iterative revising tool and the WFM services configuring client computing devices and WFM hosts in conjunction allows numerous data records to be exported from WFM hosts running the WFM services, revised over a single pass by client computing devices running the non-iterative revising tool, and imported back to the WFM hosts running the WFM services, in just minutes.

14 Claims, 16 Drawing Sheets

(56) References Cited

U.S. PATENT DOCUMENTS

| | | | |
|---|---|---|---|
| 2004/0078257 A1* | 4/2004 | Schweitzer | G06Q 10/1097 705/7.26 |
| 2004/0267591 A1* | 12/2004 | Hedlund | G06Q 10/1097 705/7.14 |
| 2005/0004828 A1* | 1/2005 | deSilva | G06Q 10/063112 705/7.14 |
| 2007/0121899 A1* | 5/2007 | Galvin | H04M 3/5183 379/265.05 |
| 2008/0059277 A1* | 3/2008 | Medina | G06Q 10/063112 705/7.14 |
| 2016/0253462 A1* | 9/2016 | Zhong | G16H 40/20 705/2 |
| 2020/0210965 A1* | 7/2020 | Garber | G06Q 10/06315 |
| 2020/0387842 A1* | 12/2020 | Hamilton | G06Q 10/063 |
| 2020/0394594 A1* | 12/2020 | Dvorscak, Jr. | G06Q 10/04 |
| 2021/0201246 A1* | 7/2021 | Krucek | H04M 3/5238 |
| 2021/0407658 A1* | 12/2021 | Taheri | G16H 40/20 |
| 2022/0083951 A1* | 3/2022 | Brager | G06N 5/01 |
| 2022/0199238 A1* | 6/2022 | Wakley | G06Q 10/06398 |
| 2023/0015083 A1* | 1/2023 | Shete | G06Q 10/06311 |

OTHER PUBLICATIONS

Lin, C. K. Y., K. F. Lai, and S. L. Hung. "Development of a workforce management system for a customer hotline service." Computers & Operations Research 27.10 (2000): 987-1004 (Year: 2000).*

Álvarez, Esteban, et al. "Efficient shift scheduling with multiple breaks for full-time employees: A retail industry case." Computers & Industrial Engineering 150 (2020): 106884 (Year: 2020).*

* cited by examiner

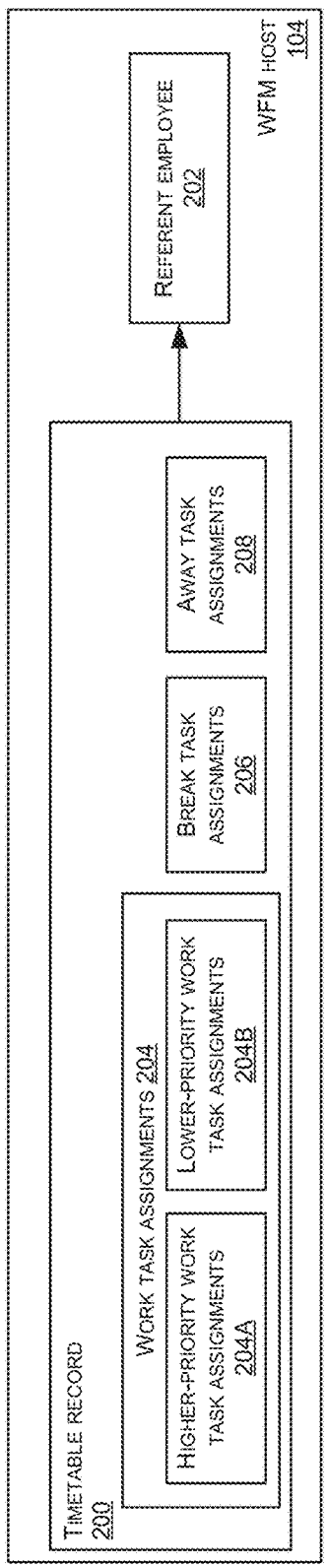
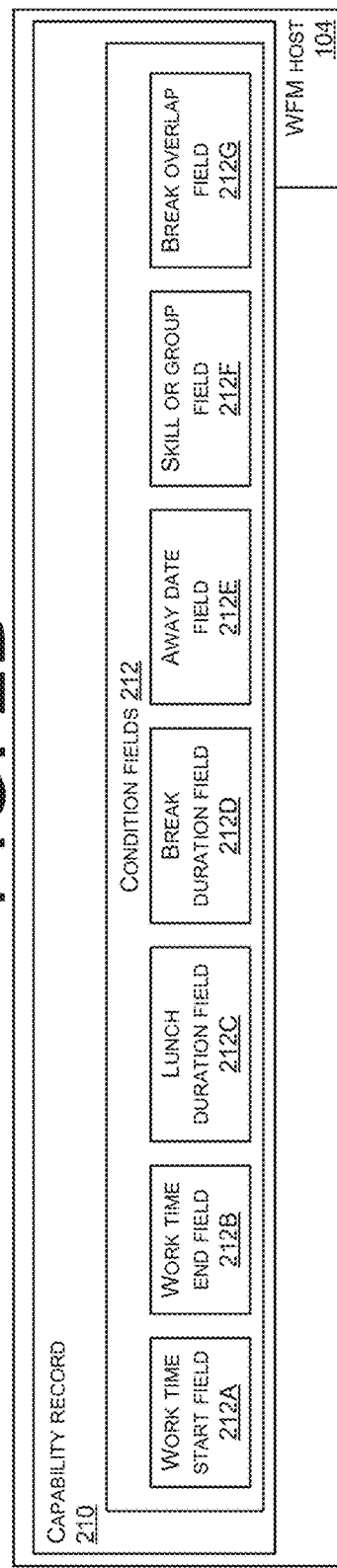
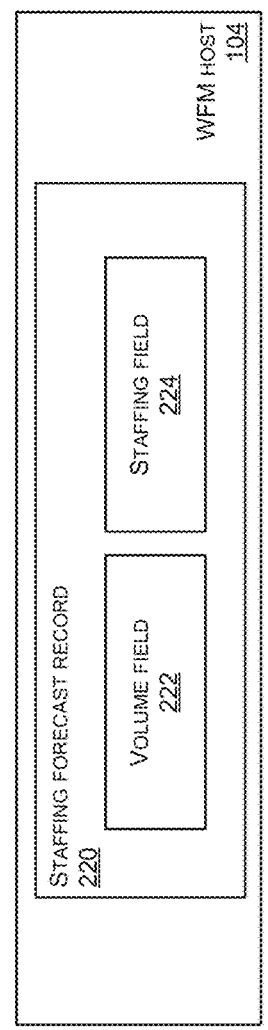
FIG. 2A
FIG. 2B
FIG. 2C

FROM FIG. 5

CLIENT COMPUTING DEVICE COMPARES VALUE OF VOLUME FIELD OF STAFFING FORECAST RECORD TO VALUE OF STAFFING FIELD OF STAFFING FORECAST RECORD TO DETERMINE WHETHER CAPABLE UNITS OF WORK AT LEAST FULFILL WORKLOAD VOLUME AT PLURALITY OF TIMESPANS
702

CLIENT COMPUTING DEVICE DETERMINES THAT CAPABLE UNITS OF WORK DO NOT FULFILL WORKLOAD VOLUME AT PLURALITY OF TIMESPANS
704

CLIENT COMPUTING DEVICE REVISES TASK ASSIGNMENT FIELDS OF PLURALITY OF TIMETABLE RECORDS TO OVERFILL FILLED TASK ASSIGNMENTS OF PRIMARY TASK TYPE RELATIVE TO WORKLOAD VOLUME OF PRIMARY TASK TYPE
706

CLIENT COMPUTING DEVICE CALCULATES UNFILLED TIME WINDOWS OF TIMETABLE RECORDS REFERENCING REFERENT EMPLOYEE AND SUMS UNFILLED TIME WINDOWS OVER EACH OF PLURALITY OF TIMESPANS
708

CLIENT COMPUTING DEVICE TRAVERSES TIMETABLE RECORDS BY ORDERING REFERENT EMPLOYEES ACCORDING TO UNFILLED TIME WINDOWS AND ORDERING PLURALITY OF TIMESPANS ACCORDING TO SUMS OF UNFILLED TIME WINDOWS
710

FROM FIG. 7A

CLIENT COMPUTING DEVICE TRAVERSES PLURALITY OF STAFFING FORECAST RECORDS BY ORDERING RESPECTIVE TASK TYPES OF STAFFING FORECAST RECORDS BY PRIORITY
712

CLIENT COMPUTING DEVICE NON-ITERATIVELY REVISES, FOR REFERENT EMPLOYEE, FILLED TASK ASSIGNMENT FIELDS OF PLURALITY OF TIMETABLE RECORDS REFERENCING REFERENT EMPLOYEE TO REMOVE EXCESS FULFILLMENT OF WORKLOAD VOLUME OF PRIMARY TASK TYPE ACROSS AT LEAST SOME OF PLURALITY OF TIMESPANS
714

CLIENT COMPUTING DEVICE NON-ITERATIVELY FILLS, FOR REFERENT EMPLOYEE, UNFILLED TASK ASSIGNMENT FIELDS REFERENCING REFERENT EMPLOYEE WITH WORK TASK ASSIGNMENTS OF SAME TYPE AS TRAVERSED STAFFING FORECAST RECORD
716

CLIENT COMPUTING DEVICE NON-ITERATIVELY REVISES, FOR REFERENT EMPLOYEE, FILLED TASK ASSIGNMENT FIELDS OF PLURALITY OF TIMETABLE RECORDS REFERENCING THE REFERENT EMPLOYEE TO SATISFY CONDITIONS OF ORGANIZATIONAL PRACTICES ACROSS AT LEAST SOME OF PLURALITY OF TIMESPANS
718

1100
FROM FIG. 7
CLIENT COMPUTING DEVICE CONFIGURED BY NON-ITERATIVE REVISING TOOL CONVERTS REVISED TIMETABLE RECORDS INTO IMPORT DOCUMENT COMPATIBLE WITH ADAPTER SERVICE OF WFM SERVICE
1102
CLIENT COMPUTING DEVICE PROVIDES IMPORT DOCUMENT TO BE RETRIEVED BY WFM HOST RUNNING ADAPTER SERVICE
1104
FIG. 11

EXPORTING WORKFORCE MANAGEMENT SERVICE RECORDS AND NON-ITERATIVELY REVISING TASK ASSIGNMENTS

BACKGROUND

Workforce management ("WFM") describes a variety of institutional processes to manage and schedule workloads and working times of organizational workforces. As workforces become vastly large in scale and geographically dispersed, WFM processes for a single organization have come to encompass scheduling for thousands or tens of thousands of personnel on a daily basis.

Furthermore, scheduling is commonly predicated upon forecasting workload volume and staffing requirements in advance of a scheduled workday. From day to day, it is possible to effectively predict future workload volume and staffing requirements based on workload volume data from past workdays. However, it is challenging to track such workload data and convert it to a format suitable for mathematical forecasting calculations.

Various computer-executable WFM tools can be deployed on enterprise computer systems to track organizational workforce personnel, computationally forecast workload volume and staffing requirements, and perform workday scheduling based on this information. However, computing systems which deploy such WFM tools are often configured to perform one-size-fits-all scheduling and forecasting processes, where granularity of scheduling does not necessarily match workplace realities. For example, personnel can be employed in different roles, and furthermore need to fulfill different responsibilities throughout a workday, substantially complicating the scheduling process across a workforce.

In light of this, schedules generated by computing systems configured by WFM tools are not easily modified using human discretion. Consequently, while organizations continue to need the scalability and computational power of WFM tools, they also have a need to adapt one-size-fits-all WFM tools to their own organizational requirements.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 2A illustrates an example of a timetable record and fields thereof according to example embodiments of the present disclosure.

FIG. 2B illustrates an example of a capability record and fields thereof according to example embodiments of the present disclosure.

FIG. 2C illustrates an example of a staffing forecast record and fields thereof according to example embodiments of the present disclosure.

FIG. 6 illustrates an illustration of a frontend application as displayed by a client computing device.

FIGS. 7A and 7B illustrate a flowchart of a non-iterative revising method according to example embodiments of the present disclosure.

FIG. 11 illustrates a flowchart of a record importing method according to example embodiments of the present disclosure.

DETAILED DESCRIPTION

Systems and methods discussed herein are directed to optimizing performance of a workforce management computing system, and more specifically configuring a computing system running a workforce management service to export records from a workforce management service, update exported records, and import updated records into the workforce management service.

Figure 1:
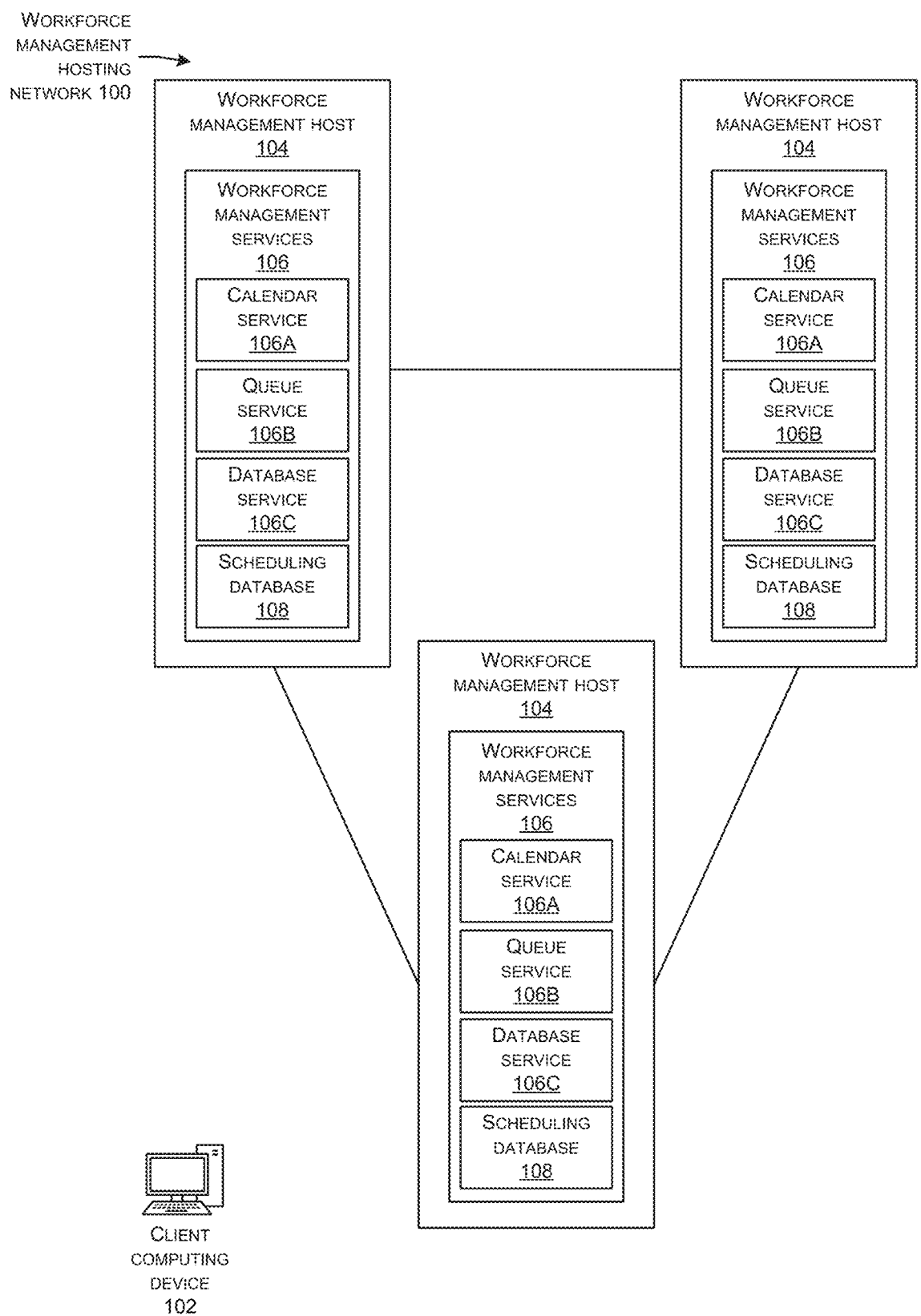
FIG. 1 illustrates a schematic diagram of a workforce management hosting network according to example embodiments of the present disclosure.

FIG. 1 illustrates a schematic diagram of a workforce management hosting network 100 according to example embodiments of the present disclosure. Example embodiments of the present disclosure can be implemented on networked computing hosts communicating over one or more private networks (such as an organizational intranet restricting access to client computing devices 102 authenticated by security credentials of an organization) and/or one or more public networks (such as the Internet). Computing hosts can include any networked computing systems, and some number of computing hosts can host computing resources; among the computing hosts, any number of workforce management hosts 104 can individually or collectively host workforce management services 106 accessible by some number of other computing hosts over a private network. Subsequently, "workforce management" can be abbreviated to "WFM," for brevity.

Any number of client computing devices 102 operated by users possessing security credentials of the organization can, by running a set of computer-executable instructions which configure the client computing devices 102 to run a user-operable frontend (subsequently referred to as a "frontend application," for brevity) to connect to the networked computing hosts (such as by one or more connections over the one or more private networks) and send a request to the WFM hosts 104, as configured by the WFM services 106, to perform operations and cause the WFM hosts 104 to perform operations as shall be described subsequently.

According to example embodiments of the present disclosure, the WFM services 106 can include at least a calendar service 106A, a queue service 106B, and a database service 106C. The WFM services 106 can further include one or more scheduling databases 108 as backends to the WFM services 106. A scheduling database 108 can be implemented as any relational or non-relational database (wherein a set of data records, each record containing some number of fields, can be stored according to any suitable database schema as known to persons skilled in the art), wherein the database service of the WFM services 106 can configure the WFM hosts 104 to create and update data records of the scheduling database 108 by calls to an application programming interface ("API") to invoke database operations.

For example, the WFM hosts 104 can be configured by a database service of the WFM services 106 to create or update data records of one or more scheduling databases 108 including timetable records, capability records, and staffing forecast records. These names should be understood as merely distinguishing several different types of data records from each other, without limiting fields and otherwise any other data that each different type of data record can contain. Each such record as described herein should be understood as referring to data structures which can be implemented according to a variety of possible database schemas. WFM hosts 104 can be configured to perform operations using data records of one or more scheduling databases 108 external to the WFM services 106, including exporting records from the WFM services 106, updating exported records, and importing the updated records into the WFM services, as shall be described subsequently. The present disclosure should not be understood as limiting the implementation of these data records as various possible data structures, except as specified below.

FIG. 2A illustrates an example of a timetable record 200 and some fields thereof according to example embodiments of the present disclosure. FIG. 2B illustrates an example of a capability record 210 and some fields thereof according to example embodiments of the present disclosure. FIG. 2C illustrates an example of a staffing forecast record 220 and some fields thereof according to example embodiments of the present disclosure.

A timetable record 200 can reference an individual employee of the organization, and a capability record 210 can also reference an individual employee of the organization. WFM hosts 104 can be configured to look up, sort, search, and the like for both of these types of records, and cross-reference both of these types of records, according to a field that identifies such individual employees, by unique identifier such as a number or other suitable identifiers. A reference written in a record to an individual employee is subsequently referred to as a "referent employee 202," for brevity. WFM hosts 104 can be further configured to look up a name of a referent employee 202 by cross-referencing other records.

It should be understood that a unique identifier can further encode information which indicates an employee's geographical location, and therefore the employee's employment jurisdiction. Therefore, WFM hosts 104 can determine an employee's employment jurisdiction without cross-referencing other records.

Multiple different types of timetable records 200 can have a same referent employee 202, or one timetable record 200 for one referent employee 202 can include multiple different types of timetables. In any case, one or more timetable records 200 for a same referent employee 202 can associate several different types of task assignments to the referent employee 202. Different types of task assignments can describe different categories of tasks that an organization employee can perform, such as work tasks, break tasks, and away tasks. While it should be understood that employees of different organizations can perform different types of work tasks, without limitation, most organizations can prioritize different types of work tasks, resulting in at least two categories of work tasks: higher-priority work tasks and lower-priority work tasks.

By way of example, some organizations operate call centers, facilities where employee are staffed to answer high volumes of customer phone calls. In practice, call centers, compared to other staffed parts of the organization, are operated at call volumes which commonly demand staffing requirements which substantially outpace staffing requirements of other parts of the organization. Consequently, for organizations operating call centers, call center work tasks can be higher-priority work tasks, and other work tasks can be lower-priority work tasks.

Therefore, by way of further example, WFM hosts 104 can be configured to write, in one or more timetable records 200 for a same referent employee, at least work task assignments 204 (including higher-priority work task assignments 204A and lower-priority work task assignments 204B), break task assignments 206, and away task assignments 208. These different types of task assignments can each be distributed over a common timespan, such as a workday, a workweek, or any other span of time over which organization employees have work duties.

According to example embodiments of the present disclosure, it should be understood that a WFM host 104 can be configured by a calendar service 106A of a WFM service 106 to fill task assignment fields in a timetable record 200. Task assignment fields of a timetable record 200 can be filled over a continuous timespan encompassed by the timetable record 200, which can include a span of a workday, a workweek, or any other span of time during which an organization employee can start work and end work. A continuous timespan encompassed by a timetable record 200 can include one or more days, and each day can be referenced by a date.

A WFM host 104 can be configured to fill a task assignment field over any continuous window of time within a timespan of a timetable record 200, thereby representing a work task assignment, break task assignment, or away task assignment for the duration of the respective window (subsequently a "task window," for brevity). Filling by a WFM host 104 can be performed by filling a continuous timespan, or by filling a sequence of adjacent time subunits of fixed lengths. Time subunits can have sufficient granularity to allow spans of minutes, hours, or days to be filled. A WFM host 104 can be configured to leave task assignment fields unfilled over any times falling outside a task assignment for that respective task type, indicating no assignment of that task type at those times.

In the event that task assignment fields of multiple types are filled over at least partially overlapping task windows, different task assignments can overlap in time. Timetable records 200 are not limited in how many different task assignment fields can be filled over overlapping times. A WFM host 104 can be configured to follow certain conditions in filling task assignment fields, allowing some task assignment fields to be filled overlapping while preventing others, as shall be described subsequently.

A capability record 210 can include any number of condition fields 212. Given a timetable record 200 and a capability record 210 having a same referent employee 202, the capability record 210 configures a WFM host 104 to limit its filling of task assignment fields of the timetable record 200.

For example, a condition field 212 can be a work start time field 212A, which configures a WFM host 104 to limit filling of task assignment fields within a workday to after a start time. A condition field 212 can be a work end time field 212B, which configures a WFM host 104 to limit filling of task assignment fields within a workday to before an end time. A condition field 212 can be a lunch duration field 212C, which configures a WFM host 104 to fill a task assignment field of a break type over a task window at least the length of a lunch duration. A condition field 212 can be a break duration field 212D, which configures a WFM host 104 to fill a task assignment field of a break type over multiple task windows at least the length of a break duration, or collectively adding up to at least the length of a break duration. A condition field 212 can be an away date field 212E, which configures a WFM host 104 to fill a task assignment field of an away type over a task window the length of a workday, the task window matching the date of an away date. A condition field 212 can be a skill or group field 212F, which configures a WFM host 104 to fill a task assignment field of any of some number of possible work types depending on the skill or group field 212F, on the basis that employees having certain skills or belonging to certain groups within the organization should primarily perform work types matching their respective skills or groups within the organization. A condition field 212 can be a break overlap field 212G, which configures a WFM host 104 to fill a work task assignment field and a break task assignment field during overlapping times (for example, break tasks could overlap with meeting work tasks, but not necessarily with other work tasks).

A staffing forecast record 220 can include at least a volume field 222 and a staffing field 224. A WFM host 104 can be configured by a queue service 106B of a WFM service 106 to forecast, based on collections of past workload volumes (which can be documented over years and indexed by month, week, and day), workload volumes for future workdays. Techniques for forecasting future workload volumes based on past workload volumes can include, for example, mathematical regression; these techniques need not described in further detail herein for understanding example embodiments of the present disclosure. A staffing forecast record 226 may further include a task type field 226, which records a type of task, among multiple possible types, for which a workload is forecast. Organizational practice records, as shall be described subsequently, may describe relative priority orderings of different types of task.

A WFM host 104 can be configured to write workload volume in a volume field 222, quantifying work to be performed over time across a workday. Such data can be quantified in units of work, which can be any arbitrary measure standardized across computations that the WFM host 104 is configured to perform by the queue service 106A of the WFM service 106. The workload volume data can vary in quantity over time throughout a workday.

By way of example, call center staffing requirements are not constant throughout a workday, fluctuating between relatively lower staffing requirements at the start and end of a workday and relatively higher staffing requirements during the middle of a workday. Thus, based on past workload volumes for a call center, a WFM host 104 can be configured to forecast future workload volumes for the same call center, where workload volume can fluctuate in such a pattern as described above.

Based on future workload volumes written in a volume field 222, a WFM host 104 can be further configured by a queue service 106B of a WFM service 106 to align work task assignments filled over a time to workload volumes forecast for the same time. For example, the WFM host 104 can be configured to compute units of work that organization employees can perform at each time (subsequently "capable units of work," for brevity) across a workday. This can be performed based on, for example, determining employees having work task assignments over each time of a workday, determining work units that each employee can perform over each time of a workday (where each employee can be weighted according to rate of work they can perform for different work tasks), and writing the determined work units in a staffing field 224 across each time of a workday.

Thus, the WFM host 104 can be configured to compare values of a volume field 222 to a staffing field 224 across each time of a workday to determine whether capable units of work at least fulfills workload volume. In the event that workload volume cannot be fulfilled by capable units of work at a particular time, the WFM host 104 can be configured to revise work task assignments and break task assignments across timetable records so that the volume is fulfilled by capable units of work, thus aligning work task assignments with forecast workload volume.

After work task assignments are aligned, a WFM host 104 can be configured by a WFM service 106 to output a summary view of timetable records 200, and output a summary view of staffing forecast records 220. A WFM host 104 can generate a summary view of records by tagging data written in the records according to any suitable visualization API as known to persons skilled in the art, such that the tagged data can be visualized on a display of a client computing device 102 configured by a frontend application.

The WFM host 104 can be configured to communicate with various client computing devices 102 operated by any organizational employee, allowing organizational employees to operate a client computing device 102 to visualize the summary view of timetable records on a display of the client computing device 102 configured by a frontend application, and to visualize the summary view of staffing forecast records on a display of the client computing device 102 configured by a frontend application. In these fashions, the WFM host 104 can be configured to perform operations using the various data records illustrated in FIGS. 2A, 2B, and 2C internal to the WFM services 106, aside from updating exported records, and importing the updated records into the WFM services, as shall be described subsequently.

Figure 3A:
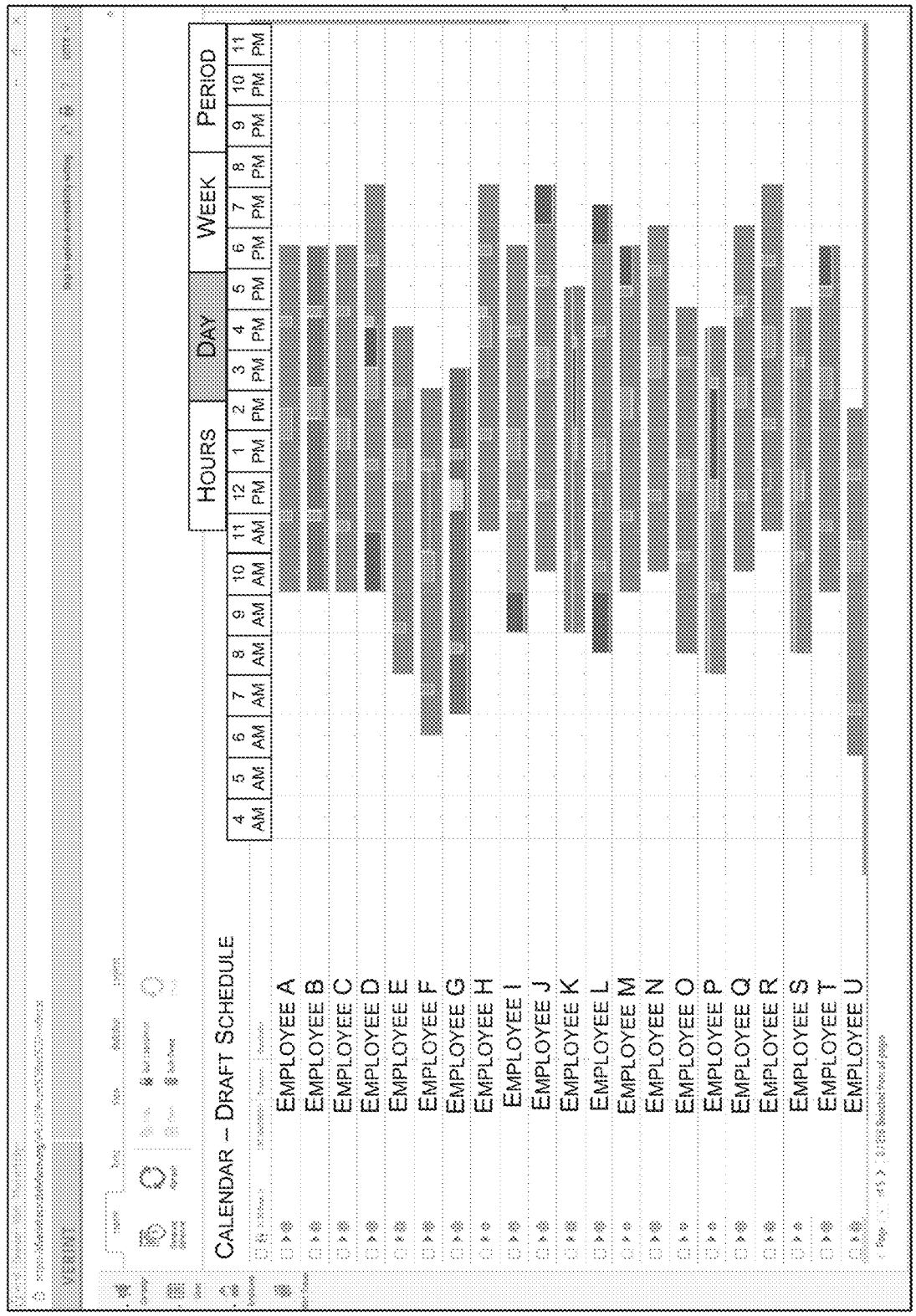
FIG. 3A illustrates a visualization of a summary view of timetable records.
Figure 3B:
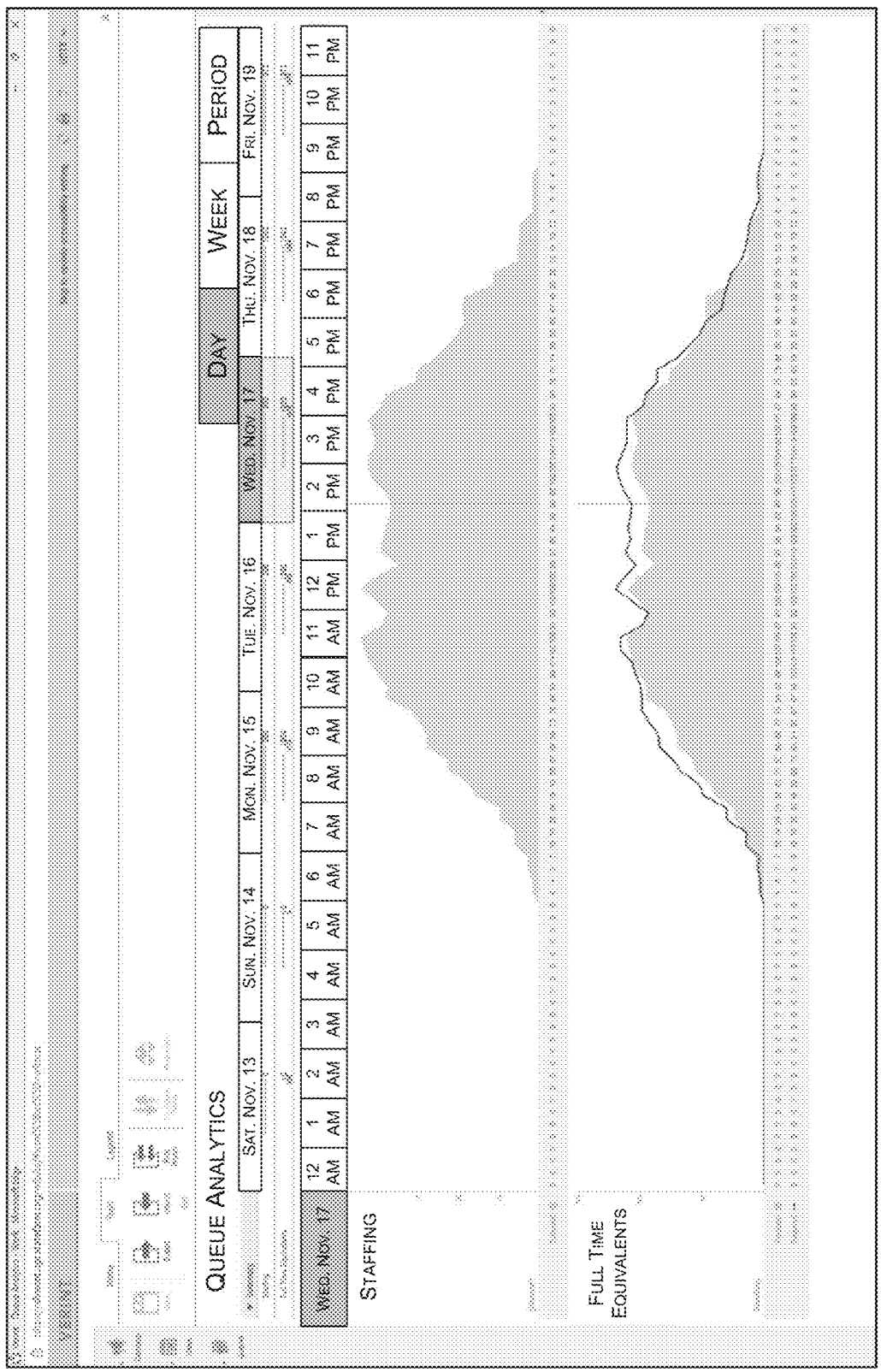
FIG. 3B illustrates a visualization of a summary view of staffing forecast records.

FIG. 3A illustrates a visualization of the summary view of timetable records, wherein different task assignments of a same referent employee are tagged, configuring the client computing device 102 to visualize different task assignments over time on a timeline. FIG. 3B illustrates a visualization of the summary view of staffing forecast records, wherein a volume field and a staffing field are tagged, configuring the client computing device 102 to visualize a volume field and a staffing field over time as overlaid line graphs.

The WFM host 104 can be configured to communicate with various client computing devices 102 operated by organizational managers, allowing an organizational manager to operate a client computing device 102 to view output work task assignments, and further manually revise work task assignments. The WFM host 104 can be configured to communicate with various client computing devices 102 operated by organizational employees, allowing an organizational employee to operate a client computing device 102 to receive allocated work task assignments. These techniques can be implemented as known to persons skilled in the art, and need not be further described herein.

However, as configured by WFM services as conventionally implemented, operations performed by WFM hosts as described above can introduce new challenges for organizational WFM processes, and additional manual work must be incurred to solve these challenges as they cannot be solved by WFM hosts as configured by conventional WFM services.

For example, work task assignments output by a WFM host configured by conventional WMF services cannot be manually revised without incurring substantial manual work. Organizational managers operating a client computing device 102 can only perform manual revision of work task assignments for at most one referent personnel at a time, since, every time task assignments of a timetable record are changed, overall work task assignments can lose alignment with forecast workload volume.

Consequently, manual revision of work task assignments commonly force an iterative process of further revising work task assignments until overall work task assignments regain alignment with forecast workload volume. After every revision, organizational managers must determine whether alignment is regained, thus incurring further time to review visualizations as described above. This forcibly iterative process consumes substantial computational resources on client computing devices 102 as well as on WFM hosts updating the revised work task assignments in timetable records.

Many diverse motivations can arise for revising work task assignments during organizational WFM processes. By way of example, the queue service of the WFM services can fail to align work task assignments with forecast workload volume, at least in part. However, for the purpose of fulfilling workload volumes for certain work tasks of interest, organizational managers have authority to allocate employees from one work task to another even at the expense of workload volumes for other work tasks no longer being fulfilled. Moreover, based on their organizational knowledge, organizational managers can choose to fulfill workload volumes for certain times of a workday at the expense of workload volumes for other times of a workday no longer being fulfilled. Thus, WFM services do not necessarily implement the same objectives as organizational managers in fulfilling workload volumes, and conventional WFM services cannot necessarily configure WFM hosts to fulfill workload volumes according to the same objectives as organizational managers.

Furthermore, by way of example, employees can become incapable of performing allocated work task assignments. Such incapability can arise from an employee suffering unexpected illness or otherwise indisposition; an employee being assigned to conflicting work responsibilities which prevent task performance, such as meetings; and the like. As a result, organizational managers can need to revise work task assignments upon employees becoming incapable, to empty task assignments fields of timetable records associated to incapable employees and then fill task assignment fields in timetable records associated to other employees to make up for possible loss of alignment.

Furthermore, by way of example, employees can be located in employment jurisdictions, wherein employee capability is subject to additional conditions. For example, employees in different employment jurisdictions can require certain break durations, breaks at certain times of day, and the like. Conventional WFM services cannot necessarily configure WFM hosts to fill task assignment fields according to jurisdiction-dependent conditions. Thus, WFM hosts can fill task assignment fields in violation of conditions of employment jurisdictions.

Furthermore, by way of example, certain work tasks cannot be performed during overly small time windows. Call center work tasks, for instance, cannot be practically performed within a time window of just a few minutes, since many common phone inquiries from customers cannot be answered satisfactorily within just a few minutes. Conventional WFM services cannot necessarily configure WFM hosts to fill task assignment fields according to practicality-based conditions. Thus, WFM hosts can fill task assignment fields so as to create schedules which are practically impossible for employees to perform.

Therefore, as a result of motivations such as those above, organizational managers can incur substantial manual workloads in order to revise work task assignments, while desiring to accomplish organizational objectives in aligning work task assignments with forecast workload volumes over time.

Consequently, example embodiments of the present disclosure provide a non-iterative revising tool which interfaces with a WFM service running on one or more WFM hosts. The non-iterative revising tool can configure WFM hosts to export timetable records and staffing forecast records from a WFM service; revise task assignments of timetable records according to conditions not implemented by conventional WFM services; compare values of staffing fields with volume fields of staffing forecast records while aligning work task assignments with forecast workload volumes; and import revised timetable records into the WFM service after work task assignments have been at least partially aligned with forecast workload volumes based on an alignment objective. By revising task assignments in a non-iterative fashion, after revising task assignments for a referent employee, the non-iterative revising tool marks the referent employee as revised and does not revise any further task assignments for that referent employee. In this fashion, the non-iterative revising tool completes the process of revising task assignments in a single pass, preventing duplicative computational workloads that would be incurred by iteratively revising work task assignments, whether manually or otherwise.

Figure 4:
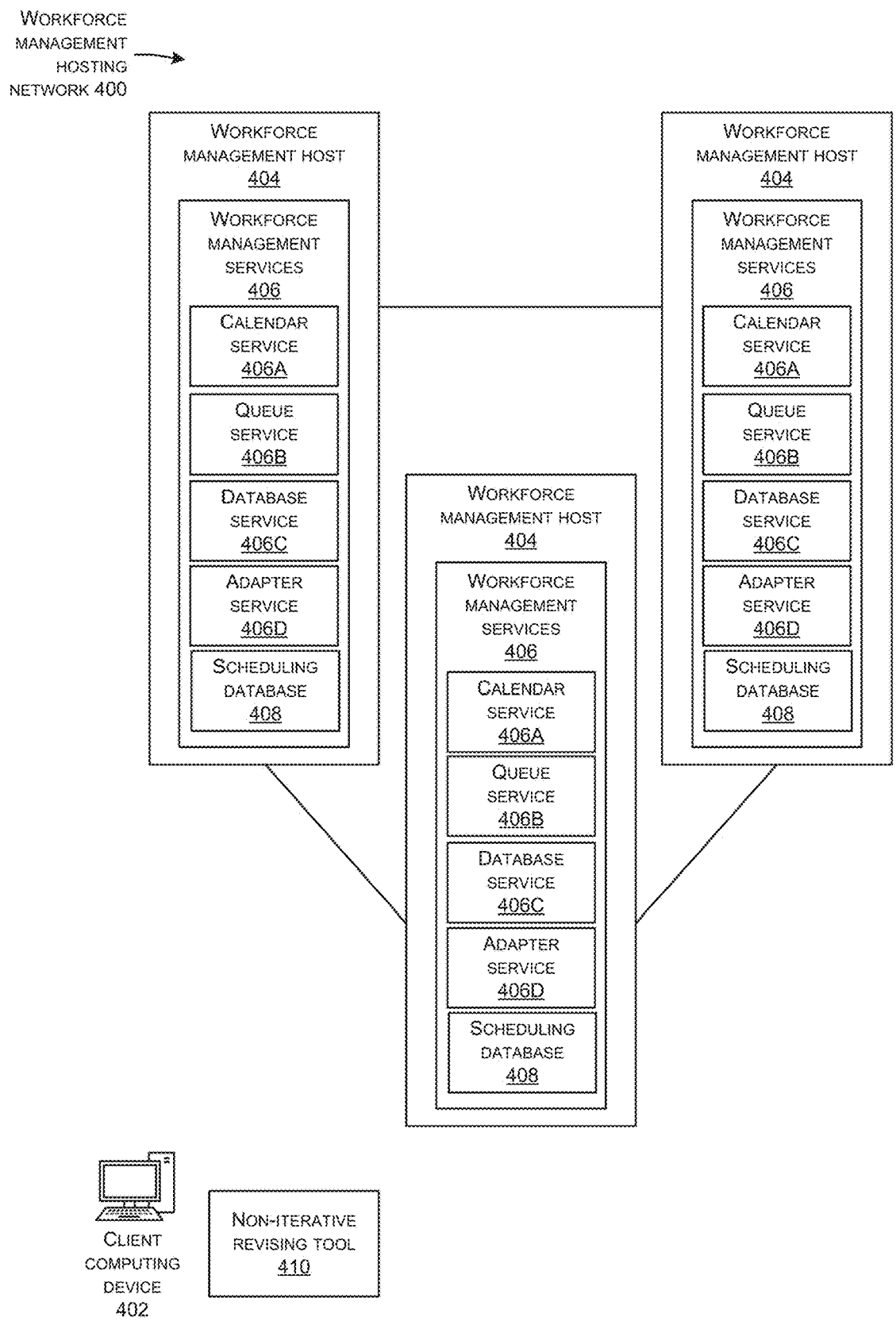
FIG. 4 illustrates a schematic diagram of a workforce management hosting network according to example embodiments of the present disclosure.

FIG. 4 illustrates a schematic diagram of a workforce management hosting network 400 according to example embodiments of the present disclosure. Example embodiments of the present disclosure can be implemented on networked computing hosts communicating over one or more private networks (such as an organizational intranet restricting access to client computing devices 402 authenticated by security credentials of an organization) and/or one or more public networks (such as the Internet). Computing hosts can include any networked computing systems, and some number of computing hosts can host computing resources; among the computing hosts, any number of WFM hosts 404 can individually or collectively host WFM services 406 accessible by some number of other computing hosts over a private network.

Any number of client computing devices 402 can be operated by users possessing security credentials of the organization to access the hosted WFM services 406. The client computing services can run a set of computer-executable instructions which configure the client computing devices 402 to execute a frontend application; connect to the networked computing hosts (such as by one or more connections over the one or more private networks); and send a request to the WFM hosts 404, as configured by the WFM services 406, to perform operations and cause the WFM hosts 404 to perform operations as described above with reference to FIG. 1.

According to example embodiments of the present disclosure, the WFM services 406 can include at least a calendar service 406A, a queue service 406B, a database service 406C, and an adapter service 406D. The WFM services 406 can further include one or more scheduling databases 408 as backends to the WFM services 406. A scheduling database 408 can be implemented as any relational or non-relational database (wherein a set of data records, each record containing some number of fields, can be stored according to any suitable database schema as known to persons skilled in the art), wherein the database service 406C of the WFM services 406 can configure the WFM hosts 404 to create and update data records of the scheduling database 408 by calls to an API to invoke database operations.

For example, the WFM hosts 404 can be configured by a database service of the WFM services 406 to create or update data records of one or more scheduling databases 408 including timetable records, capability records, and staffing forecast records. Each such record as described herein should be understood as referring to data structures which can be implemented according to a variety of possible database schemas, not limiting the implementation of these data structures except as specified above with reference to FIG. 1. Furthermore, any number of client computing devices 402 can be configured to run a non-iterative revising tool 410. Alternatively, according to other example embodiments of the present disclosure, any number of WFM hosts 404 can individually or collectively host a non-iterative revising tool 410 as a hosted service running on a WFM host 404 and by the client computing devices 402. Subsequently, the present disclosure shall treat the non-iterative revising tool 410 as running on one or more client computing devices 402 by way of example, but it should be understood that the non-iterative revising tool 410 can also run on any WFM host 404, to offload the computational workload from the client computing devices 402. To cover both examples, subsequently the present disclosure shall describe client computing devices 402 as "configured by the non-iterative revising tool 410" in either case.

Any number of client computing devices 402 operated by users as described above can, by running a set of computer-executable instructions which configure the client computing devices 402 running a frontend application, connect to the networked computing hosts and send a request to the WFM hosts 404. The client computing devices 402, as configured by the non-iterative revising tool 410, can then perform operations as shall be described subsequently.

According to example embodiments of the present disclosure, the client computing devices 402 can be configured by the non-iterative revising tool 410 to export data records and receive exported data records from WFM hosts running the WFM services 406 by calls to export APIs to invoke exporting operations, and to import data records into the WFM services 406 by calls to import APIs to invoke importing operations. The calendar service 406A, the queue service 406B, and the database service 406C can each host export APIs accessible to the WFM hosts 404, and an adapter service 406D (as shall be described subsequently) can host import APIs accessible to client computing devices 402. Therefore, a user, such as an organizational manager, can operate a client computing device 402 running a frontend application to request the WFM hosts 404 to export records from the calendar service 406A, the queue service 406B, and the database service 406C. Following the client computing device 402 performing non-iterative revising operations as configured by the non-iterative revising tool 410 (as described subsequently), the user can operate the client computing device 402 running a frontend application to request the WFM hosts 404 to import aligned records at least into the calendar service 406A.

Figure 5:
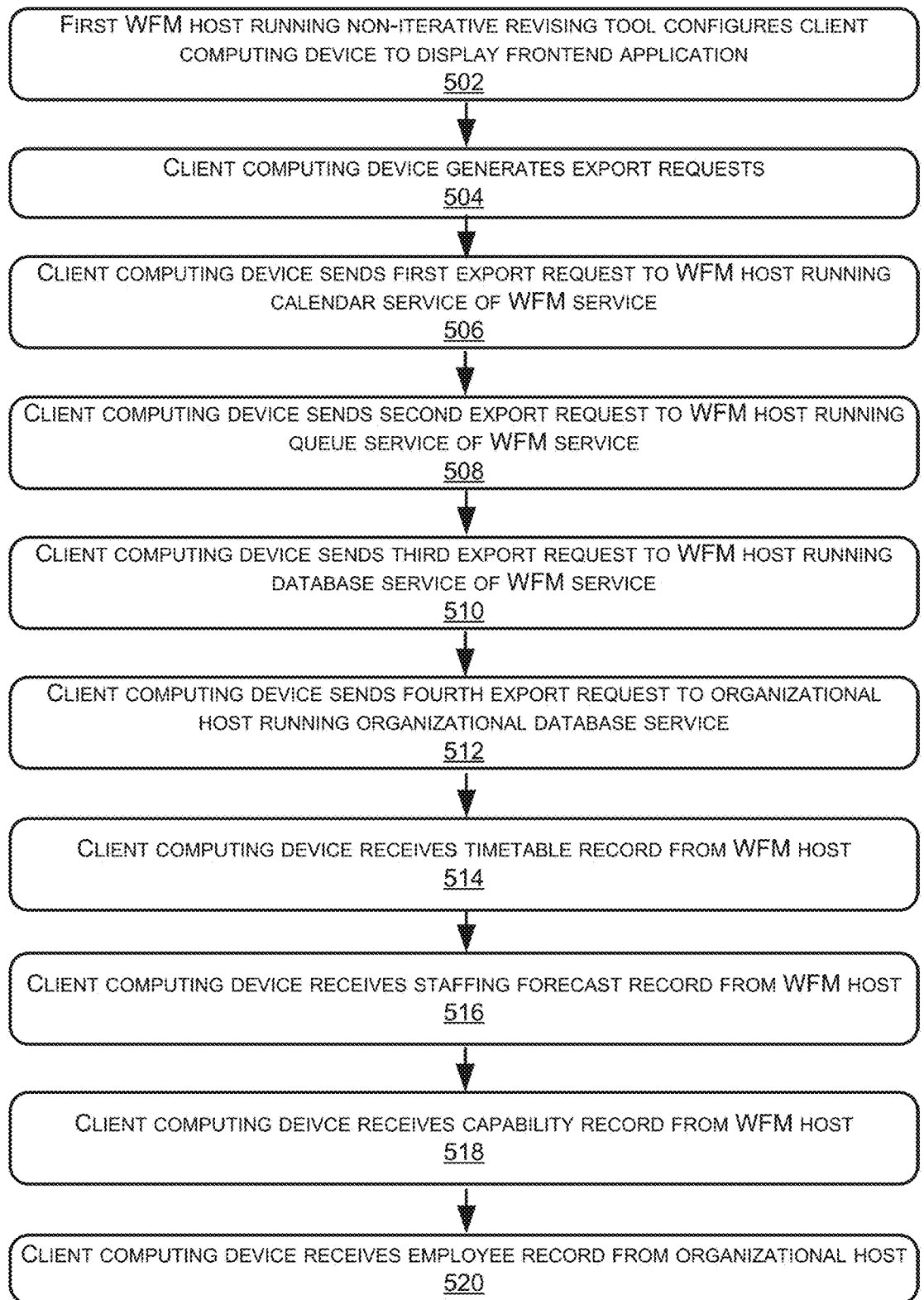
FIG. 5 illustrates a flowchart of a record exporting method according to example embodiments of the present disclosure.

FIG. 5 illustrates a flowchart indicative of a record exporting method 500 according to example embodiments of the present disclosure. It should be understood that steps of the record exporting method 500 can be performed by one or more processors of a client computing device or of a computing host, such as a WFM host, as described herein, as well as any number of other processors that could perform the steps separately or in combination with the one or more processors of a client computing device or a computing host. Such processors can perform steps of the record exporting method 500 individually or in combination, and in any order.

At a step 502, a non-iterative revising tool configures a client computing device 402 to display a frontend application. It should be understood that a frontend application displayed by a client computing device 402 (which, by way of example, can be displayed as illustrated in FIG. 6) can be operated by a user as described above to send one or more requests to the WFM hosts 404.

Figure 6:
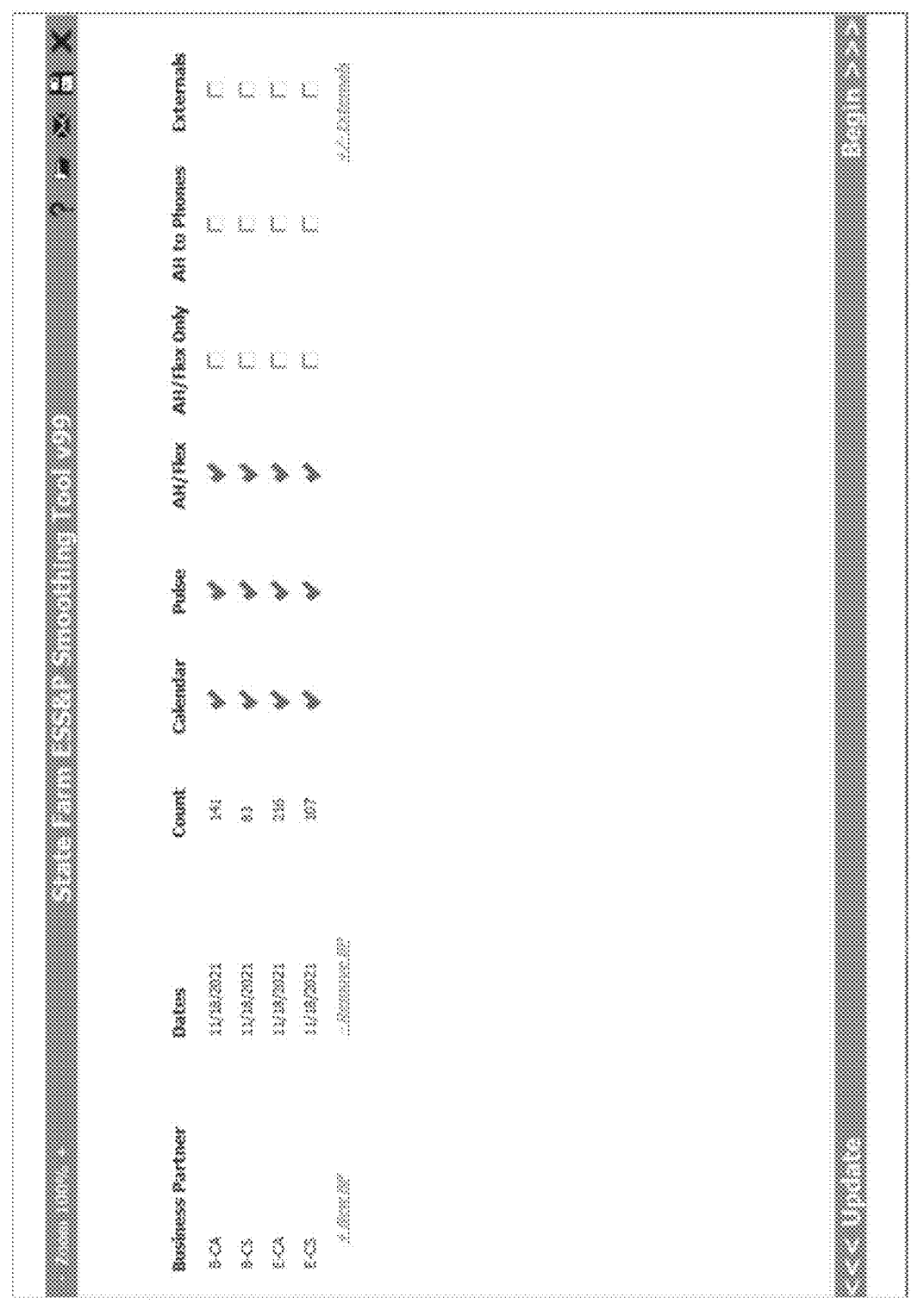

FIG. 6 illustrates an illustration of a frontend application 600 as displayed by a client computing device 402. The frontend application 600 as displayed can depict at least an export control 602. A user can operate the client computing device 402 to activate the export control 602, sending an export request to the WFM hosts 404 (such as by one or more connections over one or more private networks).

At a step 504, client computing device generates export requests. Multiple export requests, as described subsequently, can be sent to the WFM hosts 404 by a user activating the export control 602.

At a step 506, the client computing device sends a first export request to a WFM host running a calendar service of a WFM service. A first second export request can be among one or more export requests generated by the client computing device 402.

At a step 508, the client computing device sends a second export request to a WFM host running a queue service of a WFM service. A second export request can be among one or more export requests generated by the client computing device 402.

At a step 510, the client computing device sends a third export request to a WFM host running a database service of a WFM service. A fourth export request can be among one or more export requests generated by the client computing device 402.

At a step 512, the client computing device sends a fourth export request to an organizational host running an organizational database service. A fourth export request can be among one or more export requests generated by the client computing device 402.

The organizational host can further host an organizational database as a backend to the organizational database service which receives each of the above-mentioned export requests. An organizational database can be implemented as any relational or non-relational database (wherein a set of data records, each record containing some number of fields, can be stored according to any suitable database schema as known to persons skilled in the art), wherein the organizational database service can configure the organizational host to create and update data records of the organizational database by calls to an API to invoke database operations.

The organizational database can be implemented as a Microsoft Access® database, a set of Microsoft Excel® documents, or any other such suitable data structure as known to persons skilled in the art. An organizational host can be located on any network, including those outside of the workforce management hosting network 400, and thus the organizational host, the organizational database, and the organizational database service are not illustrated herein.

An organizational database can include any number of employee records, which reference an individual employee of the organization. WFM hosts 404 can be configured to look up, sort, search, and the like for employee records, as well as cross-reference employee records with timetable records 200 and capability records 210 as described above, according to a field that identifies such individual employees, by unique identifier such as a number or other suitable identifiers. WFM hosts 404 can be further configured to look up a name of a referent employee 202 by cross-referencing other records.

An organizational database can include any number of organizational practice records, which describe various practices of the organization in performing tasks. WFM hosts 404 can be configured to cross-reference organizational practice records with timetable records 200 and capability records 210 as described above. Organizational practice records can describe further conditions beyond condition fields 212 of capability records 210 as described above.

An organizational database can include any number of translation records, which map fields found in different databases storing different data, which yet have the same meaning across different database schemas. For example, in an organizational database, task types can be named differently than in a scheduling database 408. Moreover, scheduling databases 408 can store records for work task assignments for different business partners having different terminology conventions, and so translation records can map fields found in different databases storing different, yet equivalent terminology.

Thus, given a timetable record 200, a capability record 210, and an employee record having a same referent employee 202, as each illustrated above in FIGS. 2A, 2B, and 2C, further cross-referenced against any number of organizational practice records, such cross-referencing being further based on translation records. These records collectively configure a client computing device 402 to limit its revision of filling of task assignment fields of the timetable record 200.

For example, an employee record can include an incapability condition, which configures a client computing device 402 to limit revision of filled task assignment fields associated to a particular referent employee 202 so that task assignment fields are not filled for a time window in which the referent employee 202 is incapable of performing the task (due to illness, indisposition, conflicting work responsibilities, and the like).

For example, an employee record can include a jurisdiction condition, which configures a client computing device 402 to limit revision of filled task assignment fields associated to a particular referent employee 202 so that break tasks are not filled in violation of conditions of employment jurisdictions, such as certain break durations, breaks at certain times of day, and the like.

For example, an employee record can include any number of fields redundant to those found in a capability record 210. Thus, even if the capability record 210 is out of date in any regard, the employee record configures a client computing device 402 to resolve conflicts between the capability record 210 and the employee record by referencing the employee record.

For example, an organizational practice record can include a shift length condition, which configures a client computing device 402 to limit revision of filled task assignment fields associated to a same referent employee 202 so that filled task assignment fields within a same workday do not add up to more than one shift length.

For example, an organizational practice record can include a recall condition, which configures a client computing device 402 to limit revisions of filled task assignment fields associated to a same referent employee 202 so that, following filled task assignment fields within a same workday adding up to one shift length, further task assignment fields cannot be filled adding up to longer than a maximum number of call-out hours (i.e., employees cannot be recalled to work following a shift for longer than this number of hours).

For example, an organizational practice record can include a secondary task condition, which configures a client computing device 402 to identify a task type that is secondary to a primary task type, and to permit revision of filled task assignment fields of the secondary task type to filled task assignment fields of the primary task type in their place (i.e., over the same time window). By way of example, given call center work tasks as a primary task type, back office work tasks can be a secondary task type. Task assignment fields filled for back office work tasks can be revised to task assignment fields filled for call center work tasks (i.e., back office staffing can be reassigned to call center staffing during time windows with high forecast workload volumes, even at the expense of back office workload volumes not being fulfilled during those time windows).

For example, an organizational practice record can include a secondary hours condition, which configures a client computing device 402 to identify some hours of a workday that are secondary to other primary hours, and to permit revision of filled task assignment fields to complete while work task assignments are not necessarily aligned to forecast workload volumes during secondary hours, as long as work task assignments are aligned to forecast workload volumes during primary hours.

For example, an organizational practice record can include a task length condition, which configures a client computing device 402 to limit revisions of filled task assignment fields so that a given task type is never filled for a time window shorter than a task length specified (i.e., a task should not be assigned for a time window in which it is impossible to practically complete the task).

With continued reference to the example method 500 shown in FIG. 5, at a step 514 the client computing device receives a timetable record from the WFM host. The client computing device can receive the timetable record in response to the first export request generated as mentioned above with reference to step 504.

At a step 516, the client computing device receives a staffing forecast record from the WFM host. The client computing device can receive the timetable record in response to the second export request generated as mentioned above with reference to step 506.

At a step 518, the client computing device receives a capability record from the WFM host. The client computing device can receive the timetable record in response to the third export request generated as mentioned above with reference to step 508.

At a step 520, the client computing device receives an employee record from the organizational host. The client computing device can receive the timetable record in response to the fourth export request generated as mentioned above with reference to step 510.

It should be understood that the client computing device 402 can be configured to perform the above steps 506 through 520 in any order. A client computing device 402 which receives timetable records 200, staffing forecast records 220, capability records 210, and employment records can then be configured to perform the steps of the non-iterative revising method 700 as described below with reference to FIGS. 7A and 7B, so as to update exported records exported from a WFM service according to example embodiments of the present disclosure.

FIGS. 7A and 7B illustrate a flowchart of a non-iterative revising method 700 according to example embodiments of the present disclosure.

It should be understood that, prior to the non-iterative revising method 700, a client computing device 402 as described above with reference to FIG. 5 has already received any number of timetable records 200, staffing forecast records 220, capability records 210, and employment records. The client computing device 402 is further configured to cross-reference fields of these records with each other.

At a step 702, a client computing device compares respective values of a volume field of a staffing forecast record to a staffing field of the staffing forecast record to determine whether capable units of work at least fulfill workload volume at a plurality of timespans. As described herein, the term "capable units" of work refers to computed units of work that organization employees can perform at each time.

During the method 700, a client computing device 402 can be configured to output a summary view of staffing forecast records 220. A client computing device 402 can generate a summary view of records by tagging data written in the records according to any suitable visualization API as known to persons skilled in the art, such that the tagged data can be visualized on a display of a client computing device 402 configured by a frontend application.

The client computing device 402 can be operated by any organizational employee, allowing organizational employees to operate a client computing device 402 to visualize the summary view of staffing forecast records on a display of the client computing device 402 configured by a frontend application. These techniques can be implemented as known to persons skilled in the art, and need not be further described herein.

Figure 8:
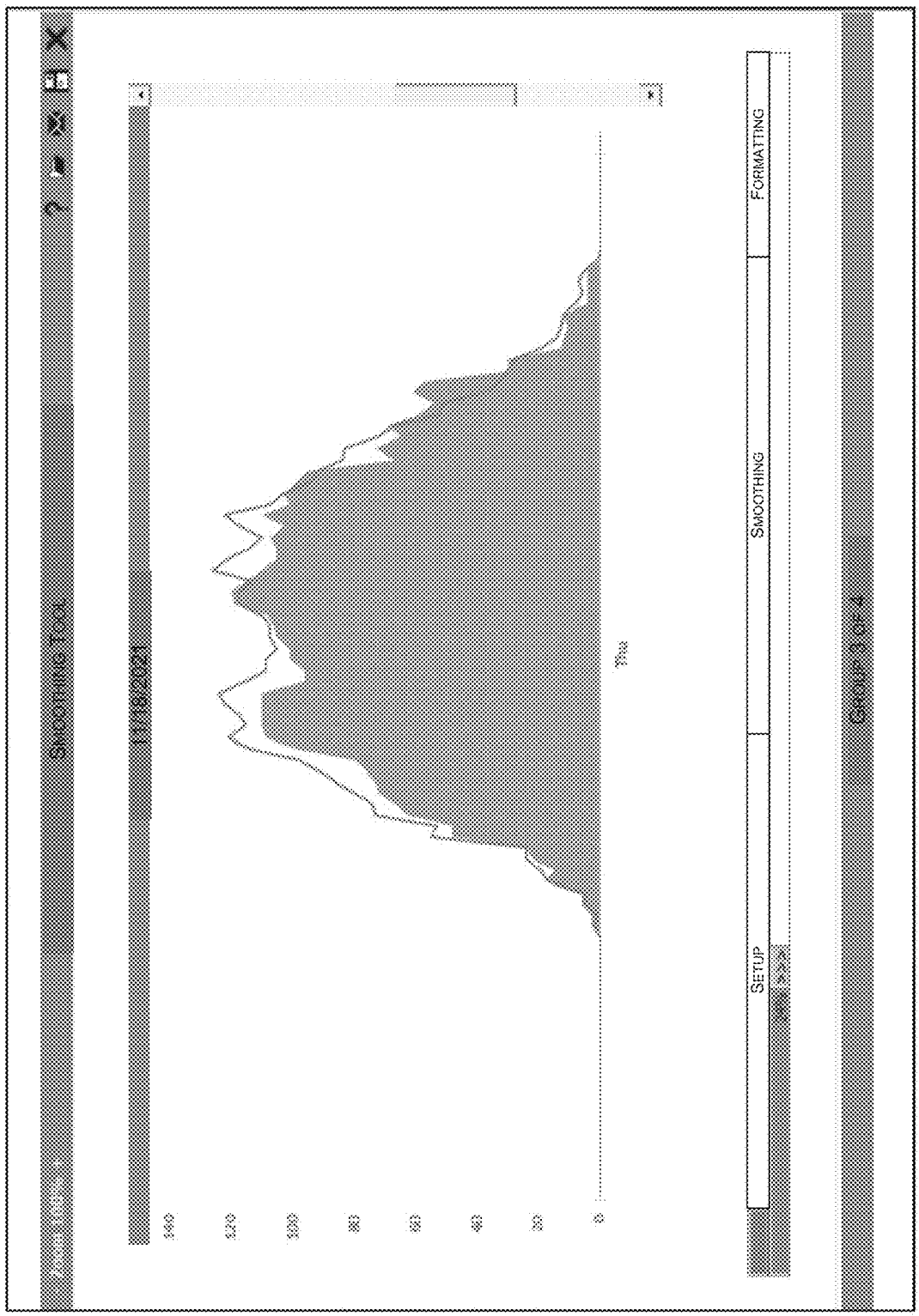
FIG. 8 illustrates an illustration of a frontend application as displayed by a client computing device.

FIG. 8 illustrates an example frontend application 800 as displayed by a client computing device 402. The frontend application 800 as displayed can depict a volume field and a staffing field are visualized over time as overlaid line charts. The WFM host 404 can, throughout performing the steps of the method 700, periodically output updated summary views of revised staffing forecast records 200, so that the client computing device 402 can periodically visualize the updated summary views on a display.

As FIG. 8 illustrates, capable units of work do not fulfill workload volume at most times of the workday shown. It should be understood that according to example embodiments of the present disclosure, capable units of work do not necessarily need to fulfill workload volume at each time of a workday for the method 700 to complete. Conditions for the method 700 to complete shall be described subsequently.

With continued reference to FIGS. 7A and 7B, at a step 704 the client computing device determines that capable units of work do not fulfill workload volume at the plurality of timespans. It should be understood that the client computing device can make this determination for any number of different times of a workday before proceeding to the next step of the method 700.

At a step 706, the client computing device revises task assignment fields of a plurality of timetable records to overfill filled task assignments of a primary task type relative to workload volume of the primary task type. The client computing device 402 can revise fields of any timetable record at a given time to increase capable units of work at that time. In addition to non-iteratively revising task assignment fields of timetable records, the client computing device 402 can overfill task assignments at each time of a workday.

For example, the client computing device 402 can be configured to revise filled task assignment fields of a secondary task type to filled task assignment fields of a corresponding primary task type in their place (i.e., over the same time window). By way of example, given call center work tasks as a primary task type, back office work tasks can be a secondary task type. Task assignment fields filled for back office work tasks can be revised to task assignment fields filled for call center work tasks (i.e., back office staffing can be reassigned to call center staffing during time windows with high forecast workload volumes, even at the expense of back office workload volumes not being fulfilled during those time windows).

Thus, according to example embodiments of the present disclosure, the client computing device 402 can overfill task assignments by provisionally revising all task assignment fields of a secondary task type to task assignment fields of a primary task type. This should be understood as allocating all possible employees from assignments of the secondary task type to assignments of the primary task type. For example, given call center work tasks and back office work tasks as described above, overfilling task assignments can refer to allocating all possible employees from back office work tasks to call center work tasks.

Furthermore, a client computing device 402 can be configured to output a provisional overfilling view of staffing forecast records 220. A client computing device 402 can generate a provisional overfilling view of records by tagging data written in the records according to any suitable visualization API as known to persons skilled in the art, such that the tagged data can be visualized on a display of a client computing device 402 configured by a frontend application. Unlike a summary view of records as described above, a provisional overfilling view does not tag a staffing field as a uniform distribution, but rather as two separate distributions of assignments of the secondary task type and assignments of the primary task type.

The client computing device 402 can be operated by any organizational employee, allowing organizational employees to operate a client computing device 402 to visualize the provisional overfilling view of staffing forecast records on a display of the client computing device 402 configured by a frontend application.

Figure 9A:
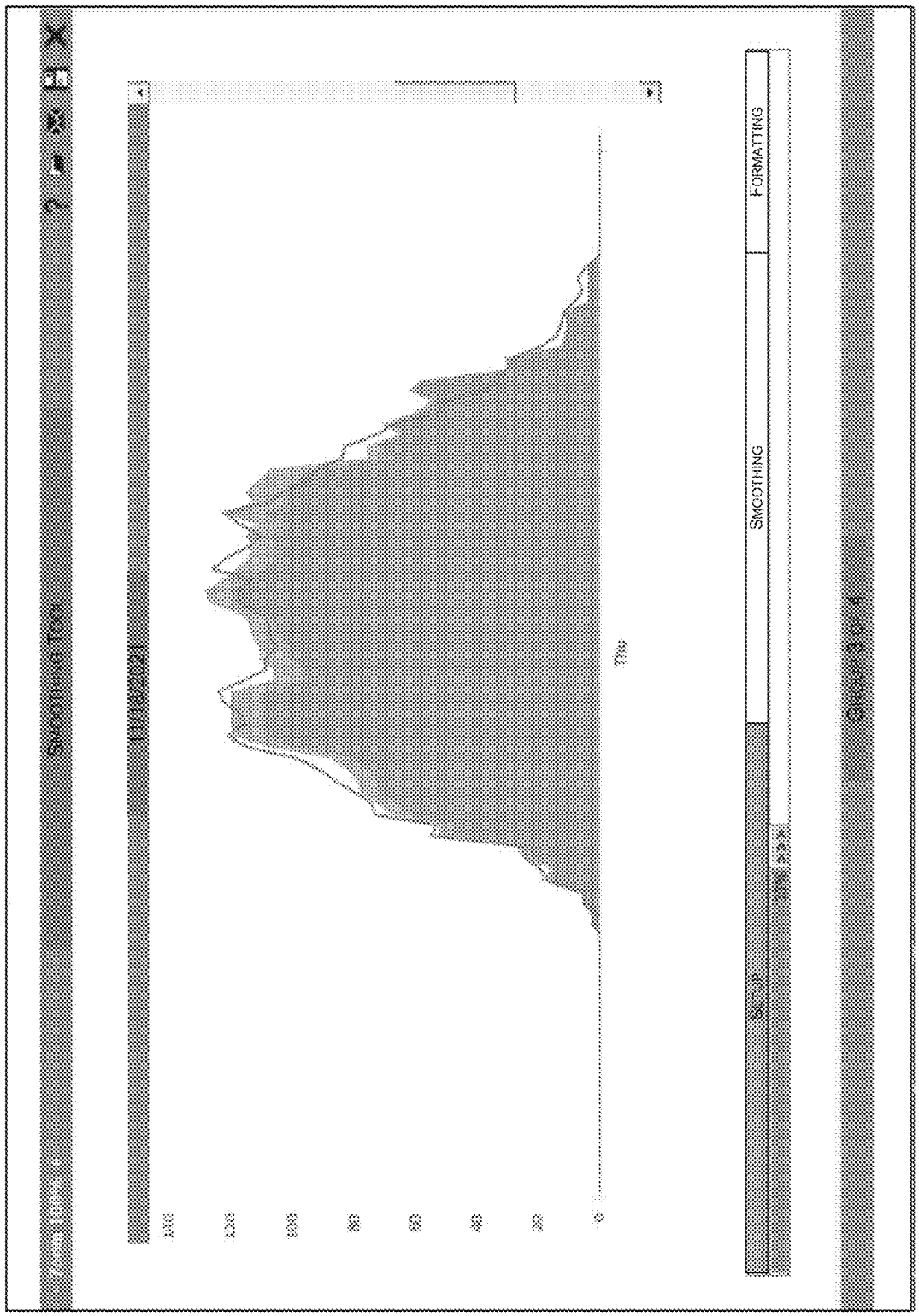
FIG. 9A illustrates a visualization of the provisional overfilling view of staffing forecast records before overfilling task assignments.

FIG. 9A illustrates a visualization of the provisional overfilling view of staffing forecast records before overfilling task assignments, wherein a volume field and a staffing field are visualized over time as overlaid line charts, and the staffing field is further illustrated as two separate distributions of assignments of the secondary task type stacked vertically over assignments of the primary task type.

It should be understood that overfilling task assignments is a provisional step during the method 700, and is not intended to ultimately result in all assignments of the secondary task type being replaced with assignments of the primary task type. Rather, overfilling task assignments results in a starting distribution of task assignments which expedites subsequent performance of the step 716. As a result of overfilling, assignments of the primary task type now fulfill a forecast workload volumes to excess, and the client computing device 402 can now replace assignments of the primary task type with assignments of the secondary task type until the forecast workload volume is not fulfilled to excess, reducing complexity of subsequent computational workloads for the client computing device 402 (compared to adding assignments of the primary task type until the forecast workload volume is fulfilled).

Consequently, the client computing device 402 can be configured to visualize the provisional overfilling view at any time, and merely illustrates how the overfilling will provisionally co-opt all assignments of the secondary task type for the expedience of subsequent revisions of task assignments.

Figure 9B:
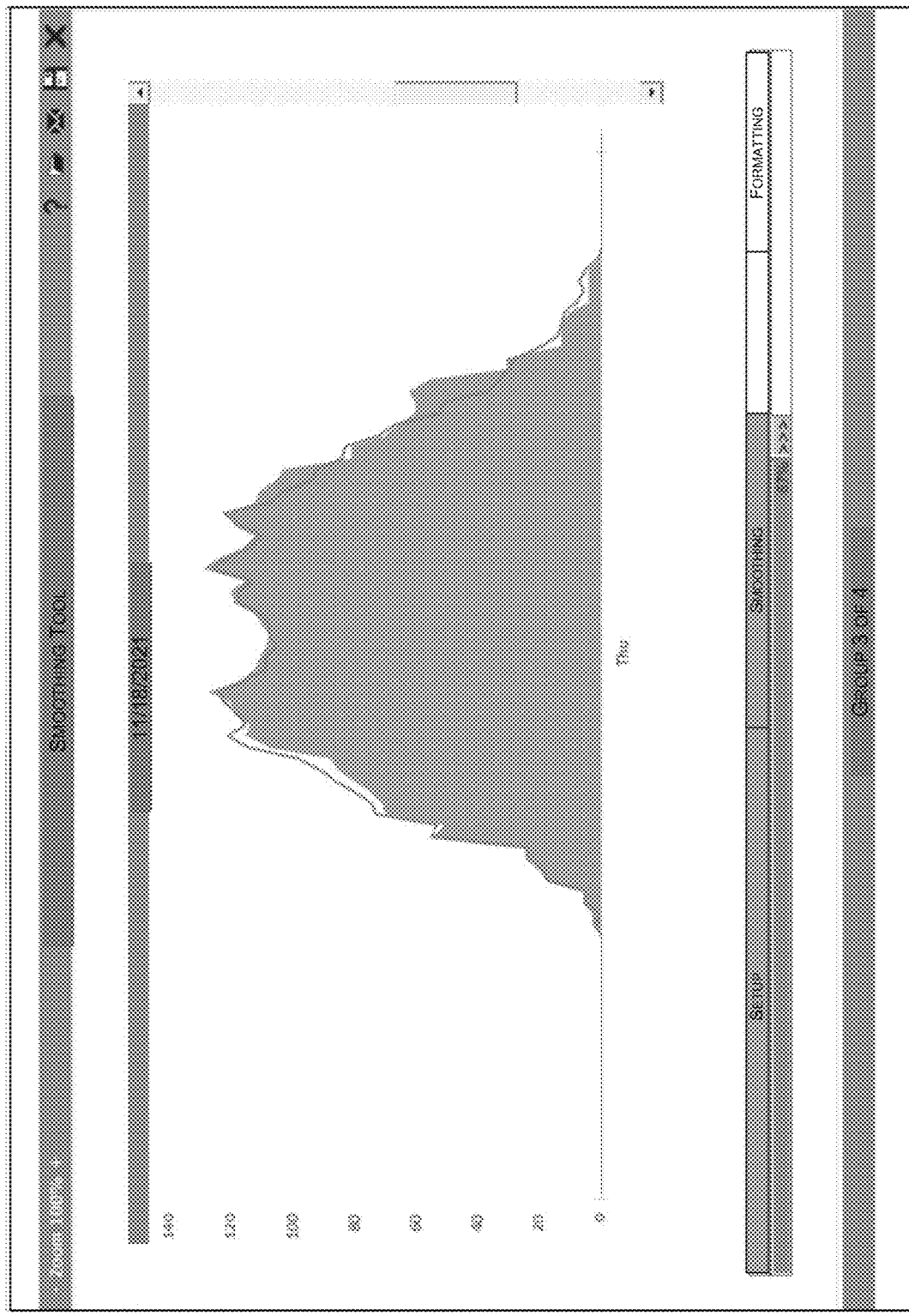
FIG. 9B illustrates a visualization of a staffing field of staffing forecast records after overfilling task assignments.

The client computing device 402 can also be configured to visualize the staffing field of staffing forecast records after overfilling task assignments. FIG. 9B illustrates a visualization of a staffing field of staffing forecast records after overfilling task assignments. Herein, the staffing field is not illustrated as two separate distributions, and the overfilling of task assignments has taken effect.

With continued reference to FIGS. 7A and 7B, at a step 708, the client computing device calculates unfilled time windows of timetable records referencing a referent employee and sums unfilled time windows over each of a plurality of timespans.

At a step 710, the client computing device traverses timetable records by ordering referent employees according to unfilled time windows and ordering the plurality of timespans according to sums of unfilled time windows.

At a step 712, the client computing device traverses a plurality of staffing forecast records by ordering respective task types of the staffing forecast records by priority.

For the purpose of understanding example embodiments of the present disclosure, it should be understood that, in implementing the subsequently described non-iterative revising process, the client computing device is configured to progressively traverse timetable records for various referent employees without revisiting. Therefore, the client computing device is configured to calculate unfilled time windows per referent employee, so as to order referent employees and traverse them in this order, visiting employees having the most unfilled time windows first. Furthermore, the client computing device is configured to sum unfilled time windows over each of a plurality of timespans (for example, a timespan may be 15 minutes in duration, in accordance with the above statement that certain work tasks cannot be performed during overly small time windows), in order to compare total unfilled time windows in each timespan to volume of a staffing forecast record in the same timespan.

In other words, the client computing device can be configured to calculate unfilled time windows both horizontally (i.e., all unfilled time windows for a same employee) and vertically (i.e., all unfilled time windows across a same timespan). By periodically recalculating unfilled time windows horizontally and vertically, and comparing calculation results to staffing forecast records, the client computing device traverses to those timetable records coinciding with referent employees having greater latitude for revising of work task assignments (since these employees have the most unfilled time windows in timetable records), and also coinciding in time with high-volume staffing forecasts.

The subsequently described steps 714, 716, and 718 are then repeated non-iteratively concurrent to periodic performances of the above steps 708, 710, and 712. Because steps 708, 710, and 712 (which can be performed in any order relative to each other) cause the client computing device to progressively traverse to timetable records for various referent employees without revisiting, the client computing device can avert performing steps 714, 716, and 718 iteratively for a same employee, can avert repeatedly revising timetable records for a same employee, and can avert revising timetable records in a looping fashion, wasting computing resources.

At a step 714, the client computing device non-iteratively revises, for a referent employee, filled task assignment fields of a plurality of timetable records referencing the referent employee to remove excess fulfillment of workload volume of the primary task type across at least some of the plurality of timespans.

The client computing device 402 can revise fields of any timetable record at a given time to increase capable units of work at that time. The client computing device 402 can revise filled task assignment fields in various manners, including, but not limited to, those described below.

The client computing device 402 can revise filled task assignment fields to replace assignments of the primary task type with assignments of the secondary task type at a time until forecast workload volume of the primary task type is not fulfilled to excess at that time.

It should be understood that the client computing device 402 is not configured to ultimately fulfill forecast workload volume at all times, so "not fulfilled to excess" can mean the forecast workload volume is fulfilled without excess at a time, or the forecast workload volume is not fulfilled at a time. It should be further understood that the client computing device 402 is not configured to prevent excess fulfillment of forecast workload volume at all times, so, ultimately, excess fulfillment can still occur at some times.

For example, a client computing device 402 can be configured according to a secondary hours condition (as mentioned above) to identify some hours of a workday that are secondary to other primary hours, and to permit revision of filled task assignment fields to complete while work task assignments are not necessarily aligned to forecast workload volumes during secondary hours, as long as work task assignments are aligned to forecast workload volumes during primary hours. By way of example, secondary hours can include early morning hours and late afternoon hours, and primary hours can include hours in between secondary hours.

The client computing device 402 can revise filled task assignment fields to move break task assignments (subject to limitations as described subsequently) to change the time windows wherein work tasks (particularly those which cannot overlap with break tasks) can have assignments filled. By non-iteratively moving break task assignments away from a particular time, the client computing device 402 can fill more work task assignments at that time, thereby increasing capable units of work at that time.

Furthermore, the client computing device 402 can directly revise filled task assignments to move non-compliant break task assignments in compliance with conditions of employment jurisdictions, as described subsequently. The client computing device 402 can be configured to limit revision of break task assignments moved into compliance, thus avoiding subsequent revisions of task assignment fields causing non-compliance and redundant revisions.

The client computing device 402 can revise filled task assignment fields to fill additional task assignment fields outside of a shift length. Such additional task assignment fields can constitute call-out hours, and therefore such revision is limited by recall conditions, as described subsequently. By recalling employees to work beyond one shift length, the client computing device 402 can increase capable units of work, though such revision is further limited by fairness computations as shall be described subsequently.

However, it should be understood that the client computing device 402 revises task assignment fields of a timetable record based on cross-referencing a referent employee 202 of the timetable record against employee records, timetable records 200 and capability records 210 as described above, and limiting revising filled task assignment fields as described above.

For example, a client computing device 402 limits revision of filled task assignment fields associated to a particular referent employee 202 so that task assignment fields are not filled for a time window in which the referent employee 202 is incapable of performing the task (due to illness, indisposition, conflicting work responsibilities, and the like).

Alternatively and/or additionally, a client computing device 402 limits revision of filled task assignment fields associated to a particular referent employee 202 so that break tasks are not filled in violation of conditions of employment jurisdictions, such as certain break durations, breaks at certain times of day, and the like.

Alternatively and/or additionally, a client computing device 402 limits revision of filled task assignment fields associated to a same referent employee 202 so that filled task assignment fields within a same workday do not add up to more than one shift length.

Alternatively and/or additionally, a client computing device 402 limits revisions of filled task assignment fields associated to a same referent employee 202 so that, following filled task assignment fields within a same workday adding up to one shift length, further task assignment fields cannot be filled adding up to longer than a maximum number of call-out hours (i.e., employees cannot be recalled to work following a shift for longer than this number of hours).

Alternatively and/or additionally, the client computing device 402 resolves conflicts between a capability record 210 and an employee record of the organizational database by referencing the employee record.

At a step 716, the client computing device non-iteratively fills, for a referent employee, unfilled task assignment fields referencing the referent employee with work task assignments of a same type as a traversed staffing forecast record.

At a step 718, the client computing device non-iteratively revises, for a referent employee, filled task assignment fields of a plurality of timetable records referencing the referent employee to satisfy conditions of organizational practices across at least some of the plurality of timespans.

As a result of the above steps 706, and during the step 714, the client computing device is fulfilling workload volume of a primary task type at the expense of a secondary task type. Although the client computing device 402 is reverting some assignments of the primary task type back to assignments of the secondary task type during step 714, the client computing device 402 is configured to further fill work task assignments of the secondary task type at the same time. Moreover, despite the above-described overfilling, timetable records for various referent employees will still include substantial unfilled time windows, which can be filled with work task assignments of yet other work task assignments.

Therefore, in order to non-iteratively revise the timetable records of the referent employee, while performing step 714, the client computing device 402 also fills otherwise unfilled time windows of the timetable records being traversed. Thus, step 714 should not be understood as performed separately from steps 716 and 718, but rather performed in conjunction with steps 716 and 718 in any order, non-iteratively, for a referent employee 202. In this fashion, non-iteratively revising the timetable records while horizontally and vertically calculating unfilled time windows may enable a client computing device 402 to assign substantially all or most pending work task assignments of a same type without having to visit all timetable records queried from a WFM host: the periodically calculated horizontal and vertical views empowers the client computing device 402 to prospectively compute how much to fill each timetable record traversed,s in order to ultimately substantially assign all or most pending work task assignments.

It should be understood that the secondary task type need not necessarily have a particular workload volume to fulfill. Instead, organizational practice records as described above can specify conditions such as a nominal volume of staffing at any given time for a secondary task type. By way of example, back office staffing requirements can be comparatively small relative to call center staffing requirements at any given time; furthermore, back office staffing requirements can be proportional to call center staffing requirements.

Furthermore, the client computing device 402 can be configured to revise filled task assignment fields in accordance with fairness computations. The client computing device 402 can be configured to, during the non-iterative revision, determine whether a fairness rule is violated. A fairness rule can be violated in the event that work task assignments for some referent employees are filled to substantially longer in duration than work task assignments for other referent employees. The client computing device 402 can be configured to revise filled task assignment fields such that fairness rules are not violated.

For example, the client computing device 402 can be configured to periodically calculate filled time windows of timetable records referencing each referent employee, and compare filled time windows among different referent employees. Given a volume of a staffing forecast record yet to be assigned, the client computing device 402 can be configured to substantially evenly divide a volume of a staffing forecast record of a task type among different referent employees, the even divisions determining a threshold for filling unfilled task assignment fields for a particular referent employee with work task assignments of that particular task type.

Furthermore, the client computing device 402 can be configured to revise filled task assignment fields in accordance with a task length condition of an organizational practice record as described above. The client computing device 402 can be configured to, during the non-iterative revision, fill any unfilled time window shorter than a task length specified by extending an adjacent filled work task assignment or by filling a break task assignment (i.e., a task should not be assigned for a time window in which it is impossible to practically complete the task). Even though the client computing device 402 is already configured to prevent work task assignments shorter than a task length, this means that unfilled time windows too short in duration can result in idle workday time, since no work tasks can be filled therein. The computing device 402 can therefore eliminate these potential idle time windows during the non-iterative revision.

Furthermore, the client computing device 402 can be configured to continue to revise task assignment fields of a timetable record based on cross-referencing a referent employee 202 of the timetable record against employee records, timetable records 200 and capability records 210 as described above, and limiting revising filled task assignment fields as described above.

Additionally, the client computing device 402 continues to resolve conflicts between a capability record 210 and an employee record of the organizational database by referencing the employee record.

For each of a plurality of referent employees 202, the client computing device 402 can be configured to perform the above steps 714 and 716 non-iteratively: that is, the client computing device 402, after filling task assignment fields of a plurality of timetable records referencing a particular referent employee 202 (in the contexts of both step 714 and step 716), marks that referent employee 202 as revised. The client computing device 402 can be configured to refrain from filling task assignment fields of any referent employee 202 already marked as revised. In this manner, the client computing device 402 can be configured to complete the non-iterative revising method 400 without repeatedly filling task assignment fields of a same referent employee 202, and furthermore avoid redundant loops of work wherein previous fillings of task assignment fields could be undone by later fillings of task assignment fields. The steps 708 and 710 are non-iteratively repeated (i.e., though they are repeated, they are not iterated; in each performance, the referent employees 202 are not duplicative) for each different referent employee 202. Upon the client computing device 402 determining that all referent employees 202 are marked as revised, the non-iterative revising method 700 completes.

After the non-iterative revising method 700 completes completes, a client computing device 402 can be configured to output a post-revision view of staffing forecast records 220. A client computing device 402 can generate a post-revision view of records by tagging data written in the records according to any suitable visualization API as known to persons skilled in the art, such that the tagged data can be visualized on a display of a computing device 402 configured by a frontend application. Unlike a summary view of records as described above, a post-revision view does not tag a staffing field as a uniform distribution, but rather as two separate distributions of assignments of the secondary task type and assignments of the primary task type.

Furthermore, after the non-iterative revising method 700 completes, a user can operate a client computing device 402 to perform the non-iterative revising method 700 any number of further times for task assignments of a same timespan or a different timespan.

The client computing devices 402 can be operated by any organizational employee, allowing organizational employees to operate a client computing device 402 to visualize the post-revision view of staffing forecast records on a display of the client computing device 402 configured by a frontend application.

Figure 10:
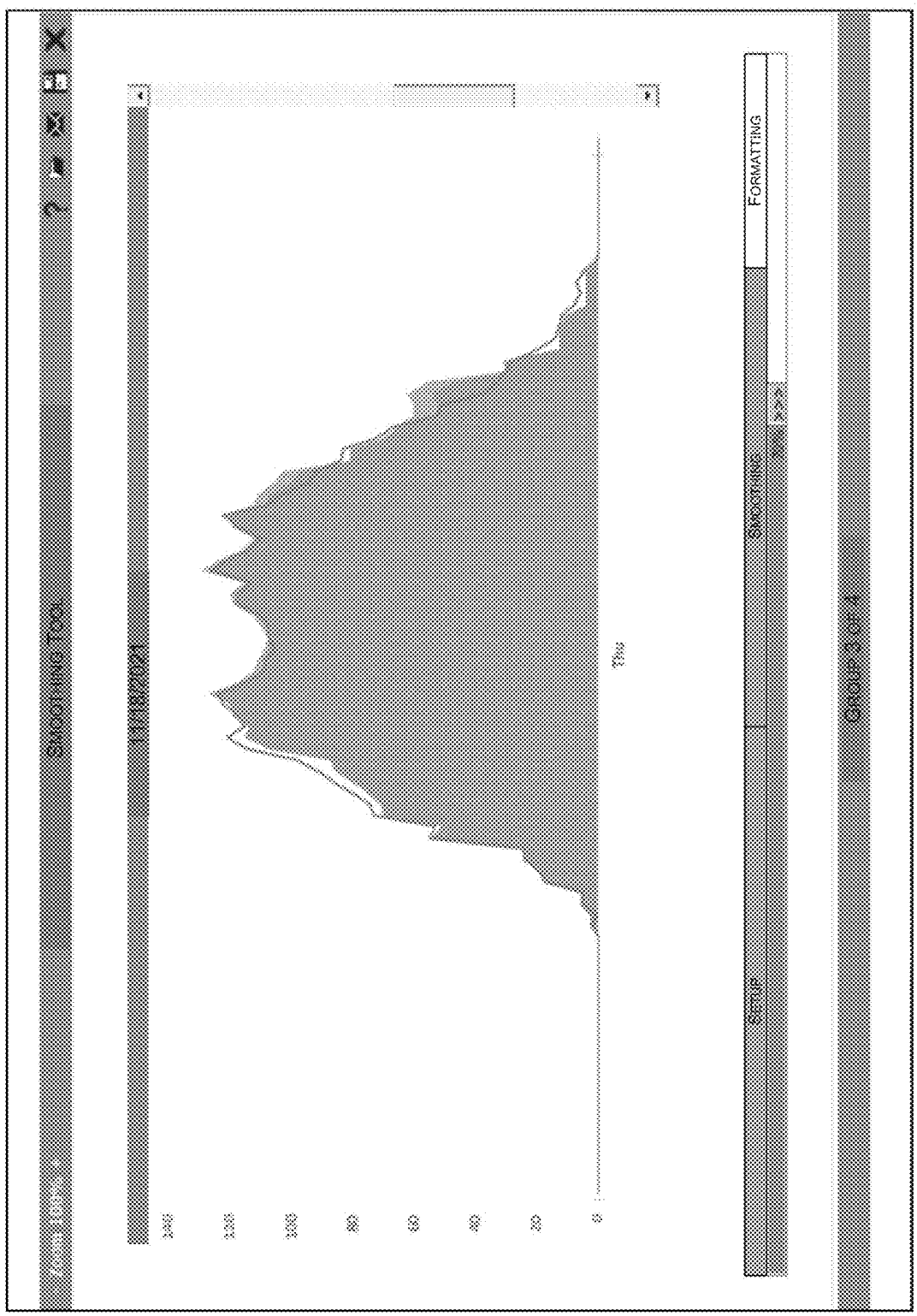
FIG. 10 illustrates a visualization of the post-revision view of staffing forecast records.

FIG. 10 illustrates a visualization of the post-revision view of staffing forecast records, wherein a volume field and a staffing field are visualized over time as overlaid line charts, and the staffing field is further illustrated as two separate distributions of assignments of the secondary task type stacked vertically over assignments of the primary task type. In comparison to the view of FIG. 8, in which capable units of work do not fulfill workload volume at most times of the workday shown, FIG. 10 demonstrates that capable units of work now fulfill workload volume at most times of the workday shown, as a result of.

FIG. 11 illustrates a flowchart of a record importing method 1100 according to example embodiments of the present disclosure.

At a step 1102, a client computing device is configured by a non-iterative revising tool to convert revised timetable records into an import document compatible with an adapter service of a WFM service.

An adapter service of a WFM service can configure a WFM host running a WFM service to receive import documents in a specified format, so that the WFM service can import data from the import documents into, for example, a calendar service. Revised timetable records need to be imported back into the WFM service so that they can be used as a basis for allocating work task assignments across an organization to actual employees, as described above. Thus, the first WFM host can be configured by the non-iterative revising tool to tag fields of revised timetable records according to a data schema specified by an import document format.

For example, an import document can include an XML document, which tags data fields of the revised timetable records in a format specified by the adapter service of the WFM service. An import document can further include a validation document, which the WFM service can configure a WFM host to write to, confirming that an import succeeded.

At a step 1104, a client computing device provides the import document to be retrieved by a WFM host running the adapter service.

For example, the client computing device can host the import document such that it is accessible over one or more private networks. The WFM host can be configured to periodically check the client computing device, and retrieve any import documents provided by the client computing device. The WFM host can further write to a validation document to confirm that the import succeeded.

Subsequently, the WFM host can be configured by the running WFM services to allocate task assignments, as non-iteratively revised, to organizational employees. The non-iterative revising tool, by itself, cannot configure a client computing device to allocate task assignments; at the same time, the WFM services, by themselves, cannot configure a client computing device to non-iteratively revise task assignments to overfill task assignments of a primary task type; remove excess fulfillment of workload volume; and revise filled task assignment fields to satisfy conditions of organizational practices. The non-iterative revising tool and the WFM services configuring client computing devices and WFM hosts in conjunction allows thousands or tens of thousands of data records to be exported from WFM hosts running the WFM services, revised over a single pass non-iteratively to meet the above requirements by client computing devices running the non-iterative revising tool, and imported back to the WFM hosts running the WFM services, in just minutes.

Figure 12:
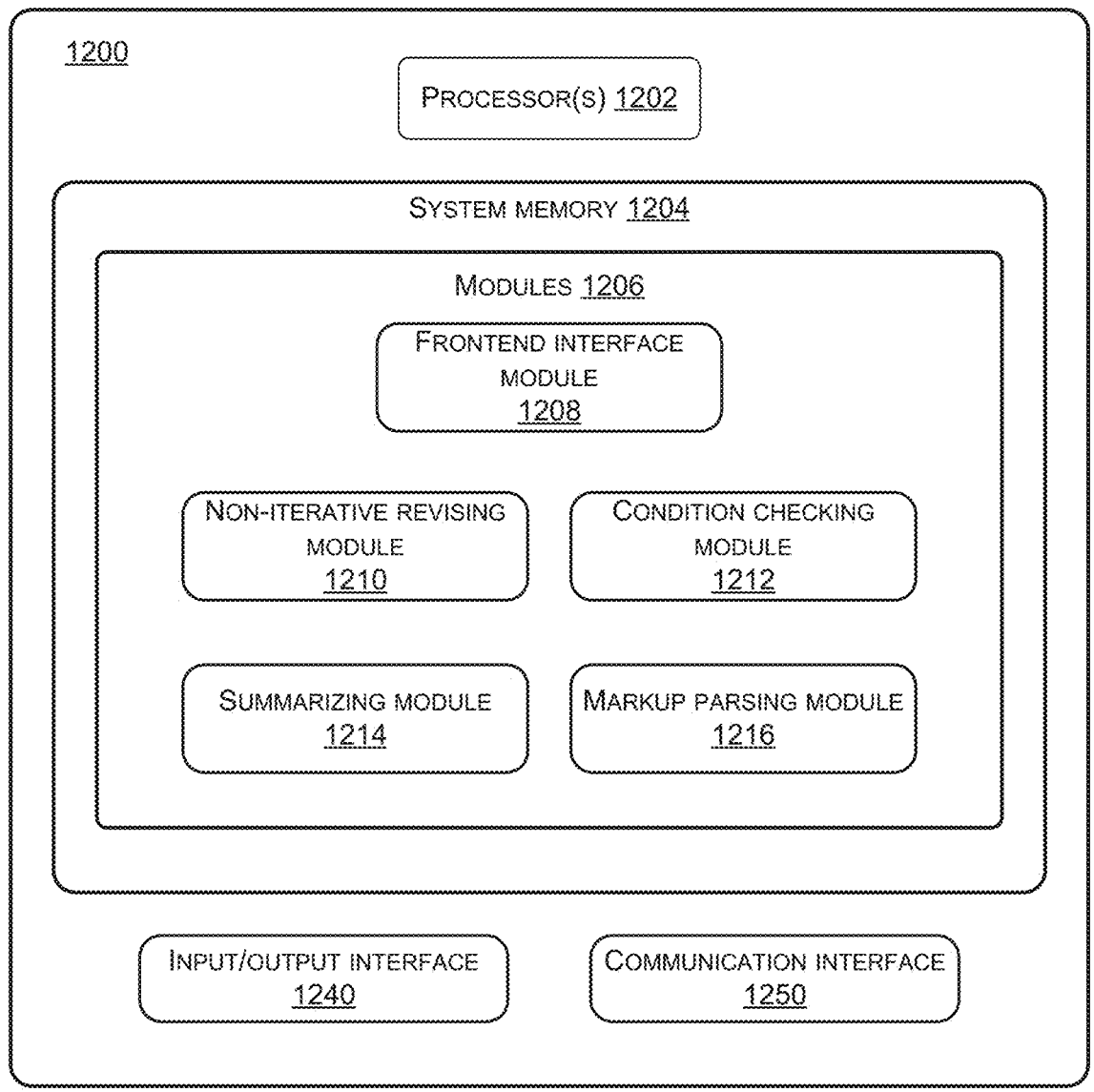
FIG. 12 illustrates an example computing host for implementing the processes and methods described above for implementing non-iterative revising.

FIG. 12 illustrates an example computing host 1200 for implementing the processes and methods described above for implementing non-iterative revising.

The techniques and mechanisms described herein can be implemented by multiple instances of the computing host 1200, as well as by any other computing device, system, and/or environment. The computing host 1200 can be any varieties of computing devices, such as personal computers, personal tablets, mobile devices, and other such computing devices. The computing host 1200 shown in FIG. 2 is only one example of a system and is not intended to suggest any limitation as to the scope of use or functionality of any computing device utilized to perform the processes and/or procedures described above. Other well-known computing devices, systems, environments and/or configurations that can be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The computing host 1200 can include one or more processors 1202 and system memory 1204 communicatively coupled to the processor(s) 1202. The processor(s) 1202 and system memory 1204 can be physical or can be virtualized and/or distributed. The processor(s) 1202 can execute one or more modules and/or processes to cause the processor(s) 1202 to perform a variety of functions. In embodiments, the processor(s) 1202 can include a central processing unit ("CPU"), a graphics processing unit ("GPU"), any combinations thereof, or other processing units or components known in the art. Additionally, each of the processor(s) 1202 can possess its own local memory, which also can store program modules, program data, and/or one or more operating systems.

Depending on the exact configuration and type of the computing host 1200, the system memory 1204 can be volatile, such as RAM, non-volatile, such as ROM, flash memory, miniature hard drive, memory card, and the like, or some combination thereof. The system memory 1204 can include one or more computer-executable modules 1206 that are executable by the processor(s) 1202.

The modules 1206 can include, but are not limited to, a frontend interface module 1208, a non-iterative revising module 1210, a condition checking module 1212, a summarizing module 1214, and a markup parsing module 1216.

The frontend interface module 1208 can configure one or more processors to communicate with various client computing devices running a frontend application to receive requests sent by users operating those client computing devices, as described herein; and perform other interactions with client computing devices running a frontend application as described herein.

The non-iterative revising module 1210 can configure one or more processors to revise task assignment fields of a plurality of timetable records to overfill task assignments of a primary task type at a plurality of timespans; non-iteratively revise filled task assignment fields of a plurality of timetable records to remove excess fulfillment of workload volume of the primary task type across a plurality of timespans; and non-iteratively revise filled task assignment fields of a plurality of timetable records to satisfy conditions of organizational practices across a plurality of timespans, each as described above.

The condition checking module 1212 can configure one or more processors to limit revision of task assignments in accordance with conditions described in capacity records and employee records; to permit revision of filled task assignment fields under certain conditions; and to resolve conflicts between capability records and employee records by referencing employee records.

The summarizing module 1214 can configure one or more processors to output a summary view of timetable records and output a summary view of staffing forecast records by tagging data written in the records such that the tagged data can be visualized on a display of a client computing device configured by a frontend application, as described herein.

The markup parsing module 1216 can configure one or more processors to tag fields of revised timetable records according to a data schema specified by an import document format.

The computing host 1200 can additionally include an input/output ("I/O") interface 1240 and a communication module 1250 allowing the computing host 1200 to communicate with other systems and devices over a network, such as other computing hosts of the service cloud network as described above. The network can include the Internet, wired media such as a wired network or direct-wired connections, and wireless media such as acoustic, radio frequency ("RF"), infrared, and other wireless media.

Some or all operations of the methods described above can be performed by execution of modules, a module including any number of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media can include volatile memory (such as random-access memory ("RAM")) and/or non-volatile memory (such as read-only memory ("ROM"), flash memory, etc.). The computer-readable storage media can also include additional removable storage and/or non-removable storage including, but not limited to, flash memory, magnetic storage, optical storage, and/or tape storage that can provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory ("PRAM"), static random-access memory ("SRAM"), dynamic random-access memory ("DRAM"), other types of random-access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other non-transmission medium that can be used to store information for access by a computing device. In contrast, communication media can embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, can perform operations described above with reference to FIGS. 1-11. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 13:
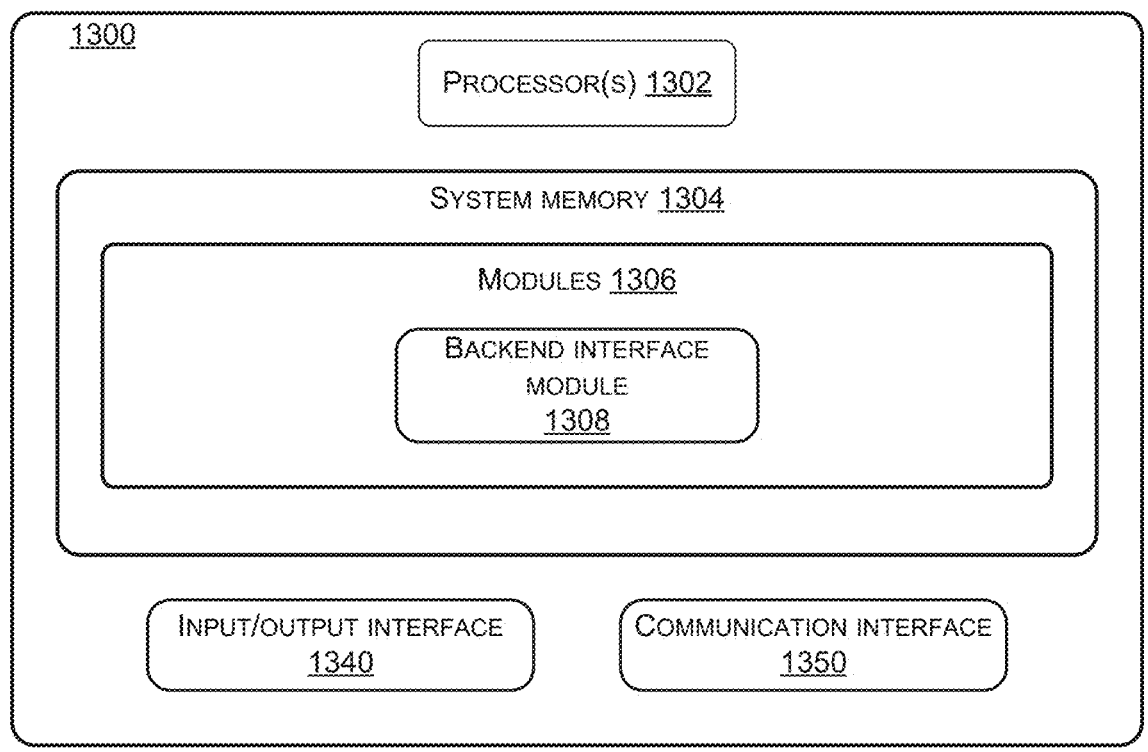

FIG. 13 illustrates an example computing host 1300 for implementing the processes and methods described above for implementing WFM services.

The techniques and mechanisms described herein can be implemented by multiple instances of the computing host 1300, as well as by any other computing device, system, and/or environment. The computing host 1300 can be any varieties of computing devices, such as personal computers, personal tablets, mobile devices, and other such computing devices. The computing host 1300 shown in FIG. 13 is only one example of a system and is not intended to suggest any limitation as to the scope of use or functionality of any computing device utilized to perform the processes and/or procedures described above. Other well-known computing devices, systems, environments and/or configurations that can be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The computing host 1300 can include one or more processors 1302 and system memory 1304 communicatively coupled to the processor(s) 1302. The processor(s) 1302 and system memory 1304 can be physical or can be virtualized and/or distributed. The processor(s) 1302 can execute one or more modules and/or processes to cause the processor(s) 1302 to perform a variety of functions. In embodiments, the processor(s) 1302 can include a central processing unit ("CPU"), a graphics processing unit ("GPU"), any combinations thereof, or other processing units or components known in the art. Additionally, each of the processor(s) 1302 can possess its own local memory, which also can store program modules, program data, and/or one or more operating systems.

Depending on the exact configuration and type of the computing host 1300, the system memory 1304 can be volatile, such as RAM, non-volatile, such as ROM, flash memory, miniature hard drive, memory card, and the like, or some combination thereof. The system memory 1304 can include one or more computer-executable modules 1306 that are executable by the processor(s) 1302.

The modules 1306 can include, but are not limited to, a backend interface module 1308.

The backend interface module 1308 can configure one or more processors to export data records and receive exported data records from WFM hosts running WFM services by calls to export APIs to invoke exporting operations, and to import data records into the WFM services by calls to import APIs to invoke importing operations. For example, among WFM services, a calendar service, a queue service, and a database service can each host export APIs accessible to the WFM hosts, and an adapter service can host import APIs accessible to the WFM hosts.

The computing host 1300 can additionally include an input/output ("I/O") interface 1340 and a communication module 1350 allowing the computing host 1300 to communicate with other systems and devices over a network, such as other computing hosts of the service cloud network as described above. The network can include the Internet, wired media such as a wired network or direct-wired connections, and wireless media such as acoustic, radio frequency ("RF"), infrared, and other wireless media.

Some or all operations of the methods described above can be performed by execution of modules, a module including any number of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media can include volatile memory (such as random-access memory ("RAM")) and/or non-volatile memory (such as read-only memory ("ROM"), flash memory, etc.). The computer-readable storage media can also include additional removable storage and/or non-removable storage including, but not limited to, flash memory, magnetic storage, optical storage, and/or tape storage that can provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory ("PRAM"), static random-access memory ("SRAM"), dynamic random-access memory ("DRAM"), other types of random-access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other non-transmission medium that can be used to store information for access by a computing device. In contrast, communication media can embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, can perform operations described above with reference to FIGS. 1-11. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, comprising:
    receiving, at a client computing device via a visualization application programming interface (API), and from a workforce management (WFM) host running a WFM service, a first plurality of visualization API tags associated with a first plurality of timetable records exported from the WFM service, wherein individual tags of the first plurality of visualization API tags represent an association between a task type and an employee associated with a first filled task assignment field of a plurality of filled task assignment fields;
    generating, at the client computing device and based on the first plurality of visualization API tags, a first summary of the first plurality of timetable records;
    generating, at the client computing device, using the first plurality of visualization API tags, a first visualization of the first summary;
    modifying, at the client computing device, the first filled task assignment field representing a secondary task type to represent a primary task type to overfill task assignments of the primary task type relative to workload volume of the primary task type at a plurality of timespans;
    determining, at the client computing device, a timetable record of the first plurality of timetable records having a greatest total amount of unfilled time;
    generating, at the client computing device, a revised timetable record by revising, non-iteratively for a referent employee associated with the timetable record, the plurality of filled task assignment fields to remove excess fulfillment of the workload volume of the primary task type across the plurality of timespans by modifying a second filled task assignment field of the plurality of filled task assignment fields representing the primary task type to represent the secondary task type;
    determining, at the client computing device, a second plurality of visualization API tags associated with a second plurality of timetable records comprising the revised timetable record, wherein a tag of the second plurality of visualization API tags represents an association of the secondary task type and the referent employee;
    generating, at the client computing device, a second summary of the second plurality of timetable records based on the second plurality of visualization API tags;
    generating, at the client computing device, using the second plurality of visualization API tags, a second visualization of the second summary; and
    transmitting, from the client computing device, the revised timetable record to the WFM host via an API causing a reconfiguration of the WFM host based on the second plurality of visualization API tags.

2. The method of claim 1, wherein overfilling the task assignments of the primary task type comprises provisionally revising the plurality of filled task assignment fields representing the secondary task type to represent the primary task type.

3. The method of claim 1, further comprising:
    receiving, from the WFM host running the WFM service, a capability record exported from the WFM service;
    receiving, from an organizational host running an organizational database service, an employee record;
    identifying a conflict between the capability record and the employee record, the capability record and the employee record having a common referent employee; and
    resolving the conflict between the capability record and the employee record by referencing the employee record.

4. The method of claim 1, further comprising:
    receiving, from an organizational host running an organizational database service, an organizational practice record; and
    revising, non-iteratively for the referent employee, the plurality of filled task assignment fields to satisfy a condition specified by the organizational practice record across the plurality of timespans.

5. The method of claim 4, wherein revising, non-iteratively for the referent employee, the plurality of filled task assignment fields comprises moving non-compliant break task assignments in compliance with conditions of employment jurisdictions.

6. The method of claim 4, wherein revising, non-iteratively for the referent employee, the plurality of filled task assignment fields comprises filling an unfilled time window shorter than a task length by extending an adjacent filled work task assignment or by filling a break task assignment.

7. The method of claim 1, further comprising converting a plurality of revised timetable records into an import document compatible with an adapter service of the WFM service.

8. A computing host, comprising:
    one or more processors; and
    memory communicatively coupled to the one or more processors, the memory storing computer-executable modules executable by the one or more processors that, when executed by the one or more processors, perform associated operations, the computer-executable modules comprising:
        a backend interface module executable by the one or more processors to:
            receive, via a visualization application programming interface (API) from a workforce management (WFM) host running a WFM service, a first plurality of visualization API tags associated with a first plurality of timetable records exported from the WFM service, wherein individual tags of the first plurality of visualization API tags represent an association between a task type and an employee associated with a first filled task assignment field of a plurality of filled task assignment fields;
        a summarizing module executable by the one or more processors to:

generate a first summary of the first plurality of timetable records based on the first plurality of visualization API tags, and generate, using the first plurality of visualization API tags, a first visualization of the first summary;

a non-iterative revising module executable by the one or more processors to:

modify the first filled task assignment field representing a secondary task type to represent a primary task type to overfill task assignments of the primary task type relative to workload volume of the primary task type at a plurality of timespans, determine a timetable record of the first plurality of timetable records having a greatest total amount of unfilled time, and generate a revised timetable record by revising, non-iteratively for a referent employee associated with the timetable record, the plurality of filled task assignment fields to remove excess fulfillment of the workload volume of the primary task type across the plurality of timespans by modifying a second filled task assignment field of the plurality of filled task assignment fields from representing the primary task type to representing the secondary task type;

the summarizing module further executable by the one or more processors to:

determine a second plurality of visualization API tags associated with a second plurality of timetable records comprising the revised timetable record, wherein a tag of the second plurality of visualization API tags represents an association of the secondary task type and the referent employee, generate a second summary of the second plurality of timetable records based on the second plurality of visualization API tags, and generate, using the second plurality of visualization API tags, a second visualization of the second summary; and the backend interface module further executable by the one or more processors to transmit the revised timetable record to the WFM host via an API to cause a reconfiguration of the WFM host based on the second plurality of visualization API tags.

9. The computing host of claim 8, wherein the non-iterative revising module is executable by the one or more processors to overfill task assignments of the primary task type by provisionally revising the plurality of filled task assignment fields representing the secondary task type to represent the primary task type.

10. The computing host of claim 8, wherein the backend interface module is further executable by the one or more processors to receive, from the WFM host running the WFM service, a capability record exported from the WFM service and receive, from an organizational host running an organizational database service, an employee record; and wherein the computer-executable modules further comprise a condition checking module executable by the one or more processors to identify a conflict between the capability record and the employee record, the capability record and the employee record having a common referent employee, and resolve the conflict between the capability record and the employee record by referencing the employee record.

11. The computing host of claim 8, wherein:

the backend interface module is further executable by the one or more processors to receive, from an organizational host running an organizational database service, an organizational practice record; and the non-iterative revising module is further executable by the one or more processors to revise, non-iteratively for the referent employee, the plurality of filled task assignment fields to satisfy a condition specified by the organizational practice record across the plurality of timespans.

12. The computing host of claim 11, wherein the non-iterative revising module is further executable by the one or more processors to revise, non-iteratively for the referent employee, the plurality of filled task assignment fields to satisfy a condition specified by the organizational practice record across the plurality of timespans by moving non-compliant break task assignments in compliance with conditions of employment jurisdictions.

13. The computing host of claim 11, wherein the non-iterative revising module is further executable by the one or more processors to revise, non-iteratively for the referent employee, the plurality of filled task assignment fields to satisfy a condition specified by the organizational practice record across the plurality of timespans comprises filling an unfilled time window shorter than a task length by extending an adjacent filled work task assignment or by filling a break task assignment.

14. The computing host of claim 8, wherein the computer-executable modules further comprise a markup parsing module executable by the one or more processors to convert a plurality of revised timetable records into an import document compatible with an adapter service of the WFM service.

\* \* \* \* \*